United States Patent
Liu et al.

(10) Patent No.: US 12,294,977 B2
(45) Date of Patent: May 6, 2025

(54) REMAINING MINIMUM SYSTEM INFORMATION (RMSI) TRANSMISSION FOR SIDELINK

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 17/677,952

(22) Filed: Feb. 22, 2022

(65) Prior Publication Data

US 2023/0269703 A1    Aug. 24, 2023

(51) Int. Cl.
*H04W 72/02* (2009.01)
*H04L 27/26* (2006.01)
*H04W 72/0453* (2023.01)
*H04W 72/20* (2023.01)
*H04W 72/30* (2023.01)

(52) U.S. Cl.
CPC ......... *H04W 72/02* (2013.01); *H04L 27/2607* (2013.01); *H04W 72/0453* (2013.01); *H04W 72/20* (2023.01); *H04W 72/30* (2023.01)

(58) Field of Classification Search
CPC ..... H04W 72/02; H04W 72/20; H04W 72/30; H04W 72/0453; H04L 27/2607
See application file for complete search history.

(56) References Cited

U.S. PATENT DOCUMENTS

| | | | |
|---|---|---|---|
| 2020/0228275 A1* | 7/2020 | Li | H04W 72/0446 |
| 2021/0051653 A1* | 2/2021 | Park | H04W 8/22 |
| 2022/0007210 A1* | 1/2022 | Yokomakura | H04W 72/0453 |
| 2022/0240260 A1* | 7/2022 | Zhou | H04W 72/02 |

FOREIGN PATENT DOCUMENTS

| | | | | |
|---|---|---|---|---|
| CN | 113727300 | * | 11/2021 | H04W 4/70 |
| CN | 113727300 A | * | 11/2021 | |
| WO | WO-2020033086 A1 | * | 2/2020 | G08G 1/22 |

* cited by examiner

*Primary Examiner* — Shukri Taha
(74) *Attorney, Agent, or Firm* — Arun Swain

(57) ABSTRACT

Aspects relate to techniques for exchanging resource pool (RP) configurations between wireless communication devices. A transmitting wireless communication device can transmit a remaining minimum system information (RMSI) message including a RP configuration of the transmitting wireless communication device to at least one receiving wireless communication device. The RMSI message is transmitted within a minimum resource block set that is common to both the transmitting wireless communication device and the at least one receiving wireless communication device. The transmitting wireless communication device may then communicate with the at least one receiving wireless communication device on a sidelink based on the RP configuration.

28 Claims, 18 Drawing Sheets

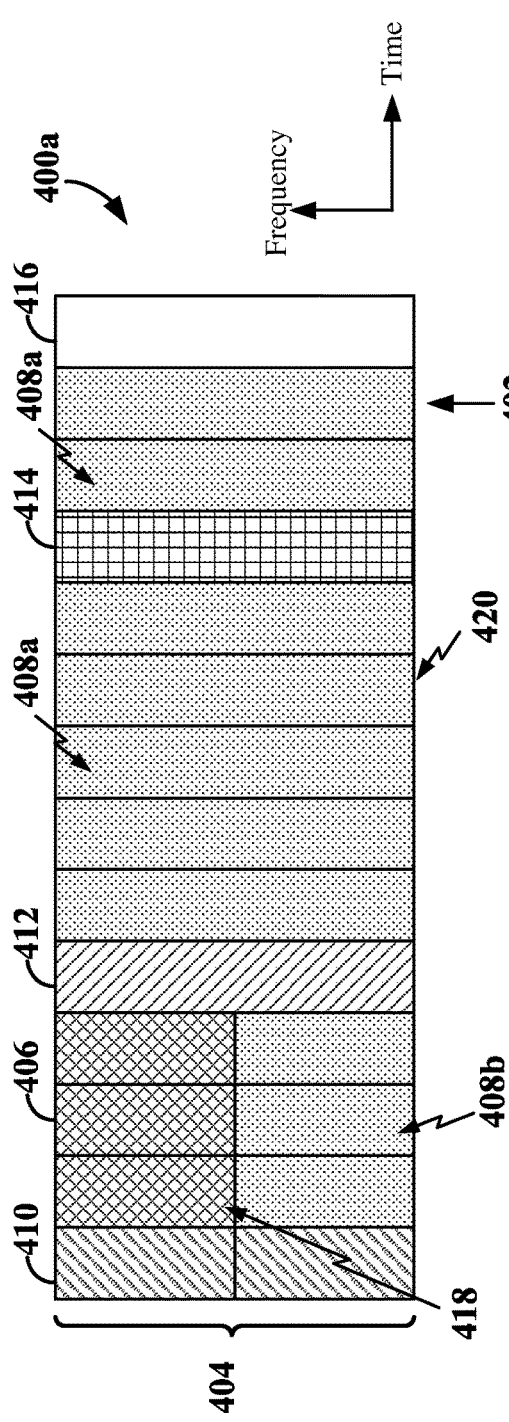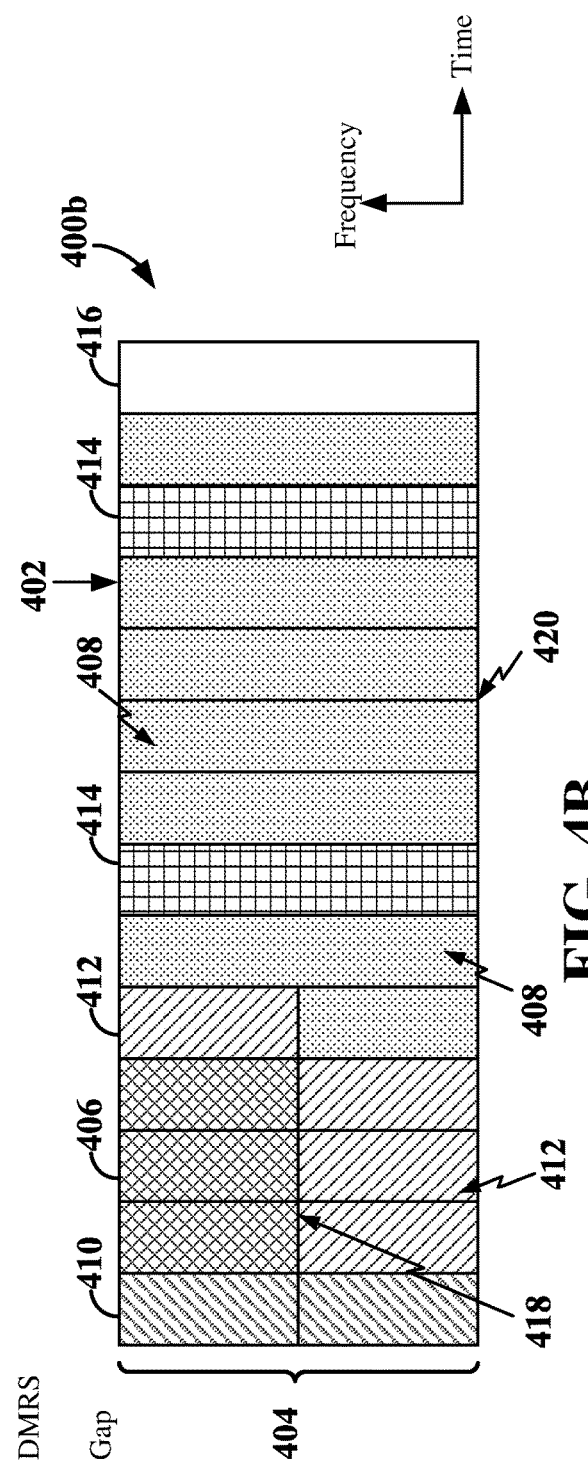
FIG. 4A
FIG. 4B

FIG. 12

| Resource Pool Configuration — 1200 | |
|---|---|
| Sidelink BWP Config — 1202 | Sidelink RB Set Config — 1204 |
| offsetToPointA — 1206 | Number of RB Sets — 1212 |
| BWP Starting RB — 1208 | Starting RB of Each Guard Band — 1214 |
| BWP Bandwidth — 1210 | Ending RB of Each Guard Band — 1216 |

REMAINING MINIMUM SYSTEM INFORMATION (RMSI) TRANSMISSION FOR SIDELINK

TECHNICAL FIELD

The technology discussed below relates generally to wireless communication networks, and more particularly, to providing remaining minimum system information (RMSI) indicating a resource pool configuration in sidelink.

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

Sidelink communication may be transmitted between UEs using transmission and/or reception resource pools. A resource pool may include one or more resource block (RB) sets, which may include, for example, one or more sub-channels. Each RB set may include, for example, fifty consecutive RBs.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a transmitting wireless communication device configured for wireless communication is disclosed. The transmitting wireless communication device includes a transceiver, a memory, and a processor coupled to the transceiver and the memory. The processor and the memory are configured to transmit a first remaining minimum system information (RMSI) message to at least one receiving wireless communication device within a minimum resource block set common to the transmitting wireless communication device and the at least one receiving wireless communication device via the transceiver. The first RMSI message can include a first resource pool configuration of the transmitting wireless communication device. The processor and the memory are further configured to communicate with the at least one receiving wireless communication device via the transceiver on a sidelink based on the first resource pool configuration.

Another example provides a method for wireless communication at a transmitting wireless communication device. The method includes transmitting a first remaining minimum system information (RMSI) message to at least one receiving wireless communication device within a minimum resource block set common to the transmitting wireless communication device and the at least one receiving wireless communication device. The first RMSI message can include a first resource pool configuration of the transmitting wireless communication device. The method further includes communicating with the at least one receiving wireless communication device on a sidelink based on the first resource pool configuration.

Another example provides a transmitting wireless communication device configured for wireless communication. The transmitting wireless communication device includes means for transmitting a first remaining minimum system information (RMSI) message to at least one receiving wireless communication device within a minimum resource block set common to the transmitting wireless communication device and the at least one receiving wireless communication device. The first RMSI message can include a first resource pool configuration of the transmitting wireless communication device. The transmitting wireless communication device further includes means for communicating with the at least one receiving wireless communication device on a sidelink based on the first resource pool configuration.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIGS. 4A and 4B are diagrams illustrating examples of sidelink slot structures according to some aspects.

FIG. 12 is a diagram illustrating an exemplary resource pool (RP) configuration according to some aspects.

DETAILED DESCRIPTION

Figure 1:
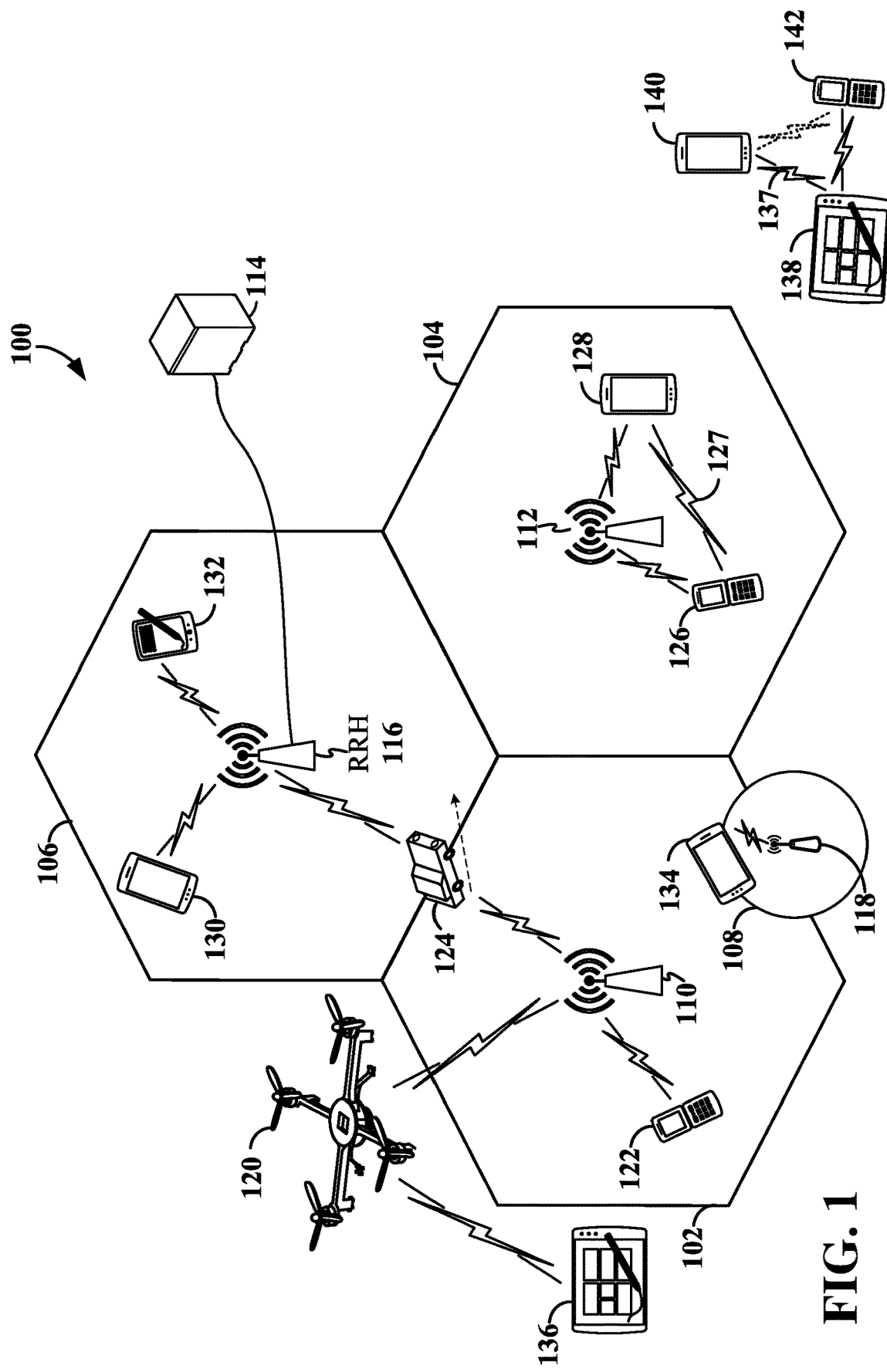
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Sidelink communication between wireless communication devices (e.g., UEs) occurs within transmission (e.g., forward link) and/or reception (e.g., reverse link) resource pools (RP). In some examples, a base station may transmit a radio resource control (RRC) configuration of the RP to be used by wireless communication devices for sidelink communication. However, for unlicensed sidelink (SL-U) or for wireless communication devices outside the coverage area of a base station, the RP configuration of each wireless communication device may be unknown, and as such, sidelink transmissions between wireless communication devices may be missed.

Various aspects of the disclosure relate to mechanisms for exchanging RP configurations between wireless communication devices using a default minimum RB set configuration. The default minimum RB set configuration identifies a minimum RB set common to all wireless communication devices among all possible RB set configurations. For example, the minimum RB set can identify usable RBs within each 20 MHz sub-band prior to RP configuration.

In accordance with aspects of the disclosure, the RP configurations may be exchanged within remaining minimum system information (RMSI) messages. For example, a transmitting wireless communication device can transmit a first RMSI message including a first RP configuration of the transmitting wireless communication device to at least one receiving wireless communication device within the minimum RB set. In some examples, the second stage sidelink control information (SCI-2) scheduling the first RMSI message may include a source identifier (ID) of the transmitting wireless communication device and either a destination ID of the receiving wireless communication device (for unicast RMSI messages) or a destination group ID of a group of receiving wireless communication devices (for broadcast/groupcast RMSI messages). The first RP configuration can include, for example, a sidelink bandwidth part (BWP) configuration and a sidelink resource block (RB) set configuration associated with the sidelink BWP configuration. The sidelink RB set configuration can include, for example, a set of one or more RB sets, a respective starting RB of each of a plurality of guard bands between respective ones of the one or more RB sets, and a respective ending resource block of each of the plurality of guard bands.

In some examples, the first RP configuration is group specific. In this example, the first RMSI message can include the group identifier (ID) of the group associated with the first RP configuration or the destination group ID can be included in the SCI-2 scheduling the first RMSI message, as discussed above. In examples in which the group ID is included in the first RMSI message, the first RMSI message can include multiple group RP configurations, each associated with a respective group ID.

The transmitting and receiving wireless communication devices can then communicate via a sidelink therebetween based on the first RP configuration. For example, the first RP configuration may include a forward link RP configuration associated with sidelink transmissions from the transmitting wireless communication device and/or a reverse link RP configuration associated with sidelink transmissions received by the transmitting wireless communication device. In an example, the forward link RP configuration may be used for broadcast or groupcast transmissions to the receiving wireless communication devices, whereas the reverse link RP configuration may be used for a unicast transmission from a receiving wireless communication device.

The transmitting wireless communication device may further receive acknowledgement information from the receiving wireless communication device(s). For example, if the first RMSI is a unicast message, the transmitting wireless communication device may receive acknowledgement information carrying an ACK or NACK from a receiving wireless communication device. As another example, if the first RMSI message is a broadcast or groupcast message, the transmitting wireless communication device may receive acknowledgement information carrying only NACKs from those receiving wireless communication devices that did not successfully receive the first RMSI message. In this example, the acknowledgement information carrying only NACKs may be received together in a single sidelink feedback resource.

In addition, a receiving wireless communication device can transmit a second RMSI message including a second RP configuration of the receiving wireless communication device to the transmitting wireless communication device. The second RMSI message may be, for example, a unicast, broadcast, or groupcast message transmitted within the minimum RB set. The transmitting wireless communication device and receiving wireless communication device can then communicate using at least one of the first and/or second RP configurations. For example, for broadcast transmissions from the transmitting wireless communication device, the first RP configuration (e.g., the forward link RP configuration in the first RP configuration) may be used, whereas for unicast transmissions from the receiving wireless communication device, the second RP configuration (e.g., the reverse link RP configuration in the second RP configuration) may be used.

In some examples, the transmitting wireless communication device may transmit a request for the second RP configuration to the receiving wireless communication device. In some examples, the request may be transmitted within the RB set. In other examples, the request may be transmitted using the first RP configuration. For example, the request may be transmitted to a group of receiving wireless communication devices using the first RP configuration. In some examples, the request may be transmitted within SCI-2 scheduling a unicast, groupcast, or broadcast sidelink message.

In some examples, the transmitting wireless communication device may transmit the first RMSI message upon establishing a connection with one or more receiving wireless communication devices. In some examples, the transmitting wireless communication device may periodically transmit the first RMSI message to the at least one receiving wireless communication device to facilitate broadcasting/groupcasting.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
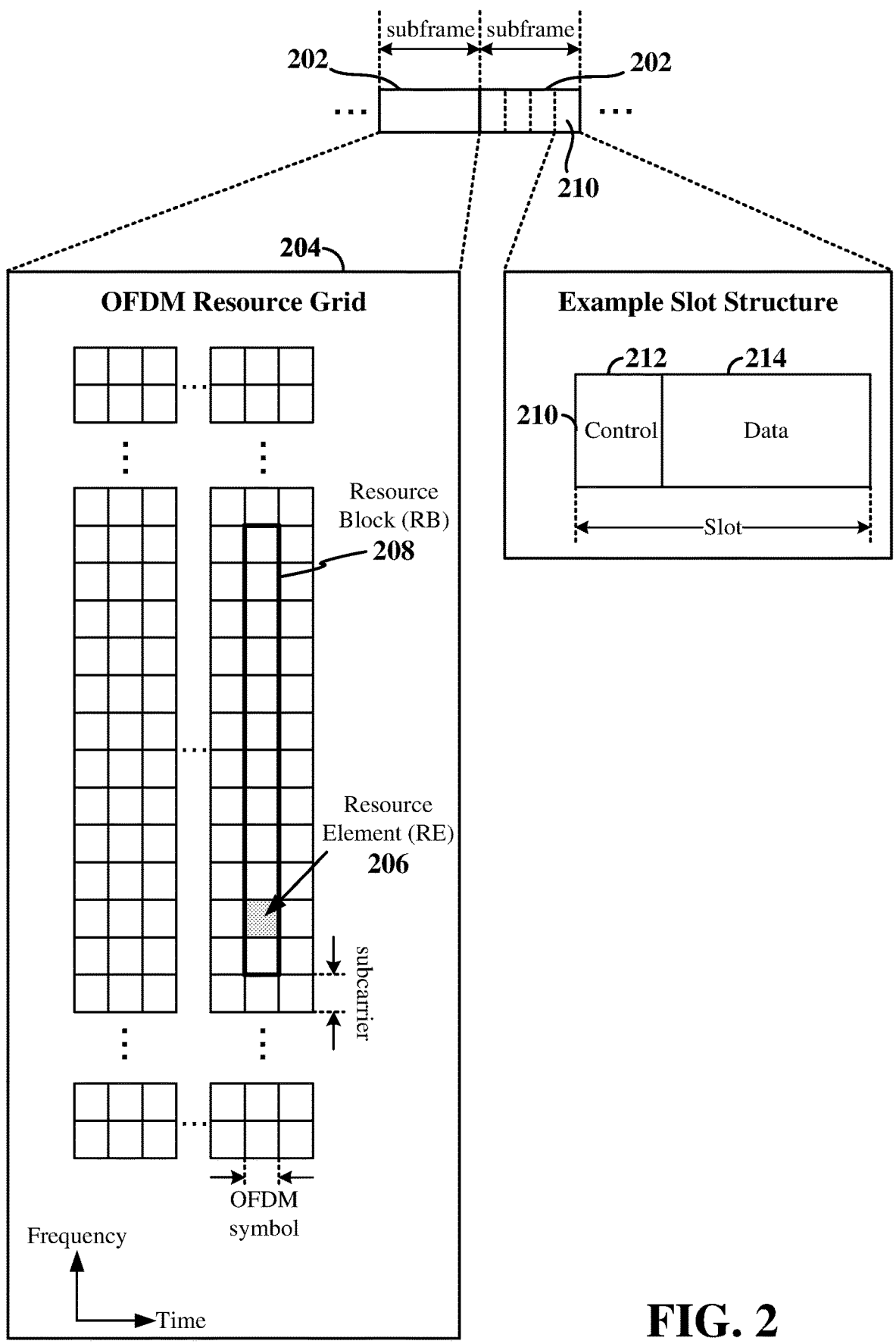
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, a sidelink DMRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
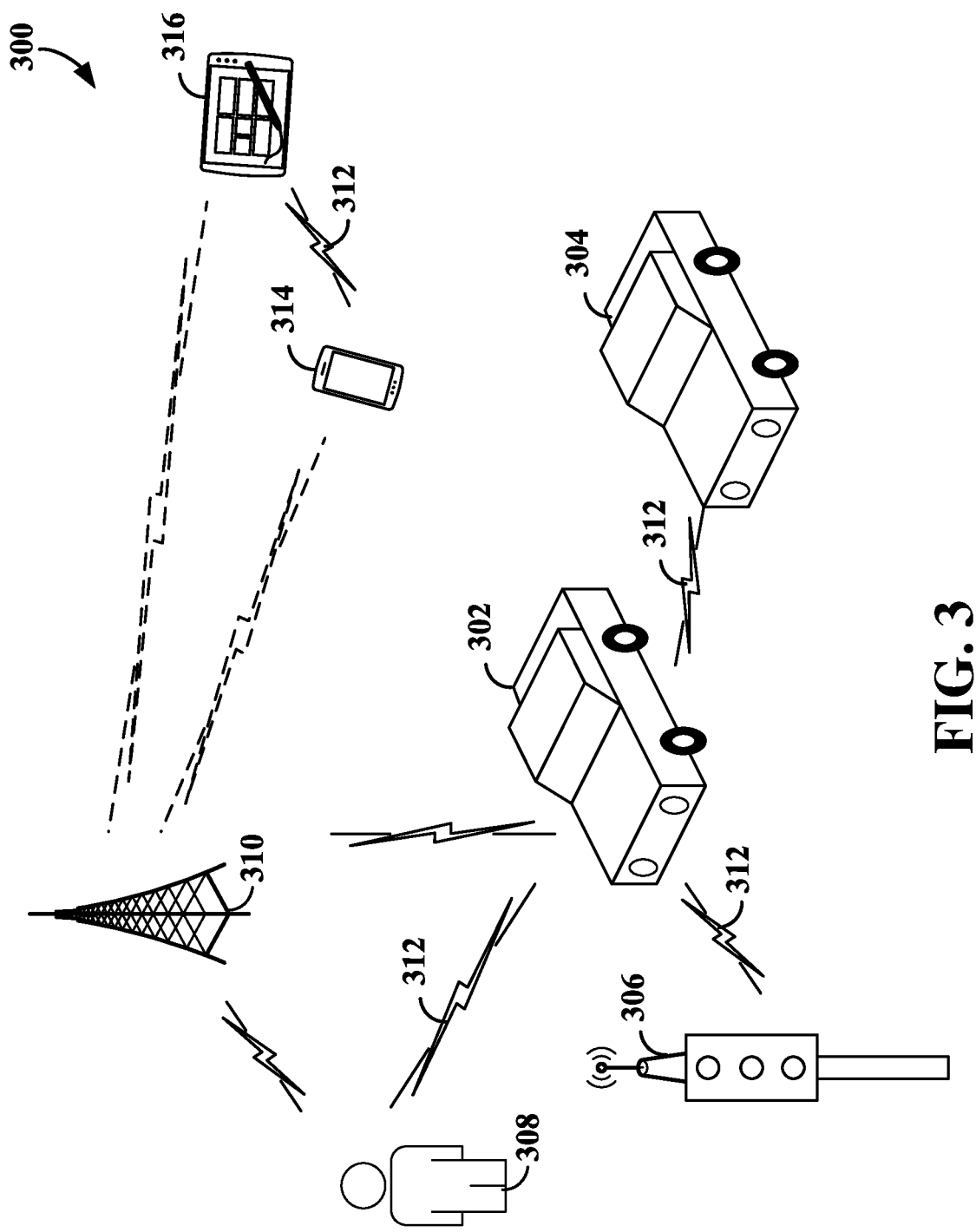
FIG. 3 is a diagram illustrating an example of a wireless communication network employing sidelink communication according to some aspects.

FIG. 3 illustrates an example of a wireless communication network 300 configured to support sidelink communication. In some examples, sidelink communication may include D2D or V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel, which may include, for example, 10, 15, 20, 25, 50, 75, or 100 consecutive RBs, and the minimum resource allocation unit in time may be one slot. The number of sub-channels in a resource pool may include between one and twenty-seven. The configuration of the resource pool (RP) utilized between two sidelink devices for communication therebetween may be provided by a base station (e.g., base station 310) or may otherwise be configured, as described herein. In some examples, the RP configuration indicates one or more RB sets to be used between sidelink devices. For example, one RB set may include approximately 50 RBs for a subcarrier spacing (SCS) of 30 kHz, resulting in a 20 MHz bandwidth (BW).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

FIGS. 4A and 4B are diagrams illustrating examples of sidelink slot structures according to some aspects. The sidelink slot structures may be utilized, for example, in a V2X or other D2D network implementing sidelink In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 15, 20, 25, 50, 75, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 (e.g., SCI format 1-A) that schedules transmission of data traffic (e.g., a packet) on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSCCH resource size may be fixed for a resource pool (e.g., 10% to 100% of one sub-channel in the first two or three symbols). For example, the PSCCH 406 may occupy 10, 12, 15, 20, or 25 RBs of a single sub-channel. In each of the examples shown in FIGS. 4A and 4B, the starting symbol for the PSCCH 406 is the second symbol of the corresponding slot 400a or 400b and the PSCCH 406 spans three symbols 402. The PSCCH 406 may further include DMRSs.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 256-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In some examples, the DMRSs 414 may be based on a Gold sequence and a configuration type 1 may be used for the frequency domain pattern of the PSSCH DMRSs 414. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
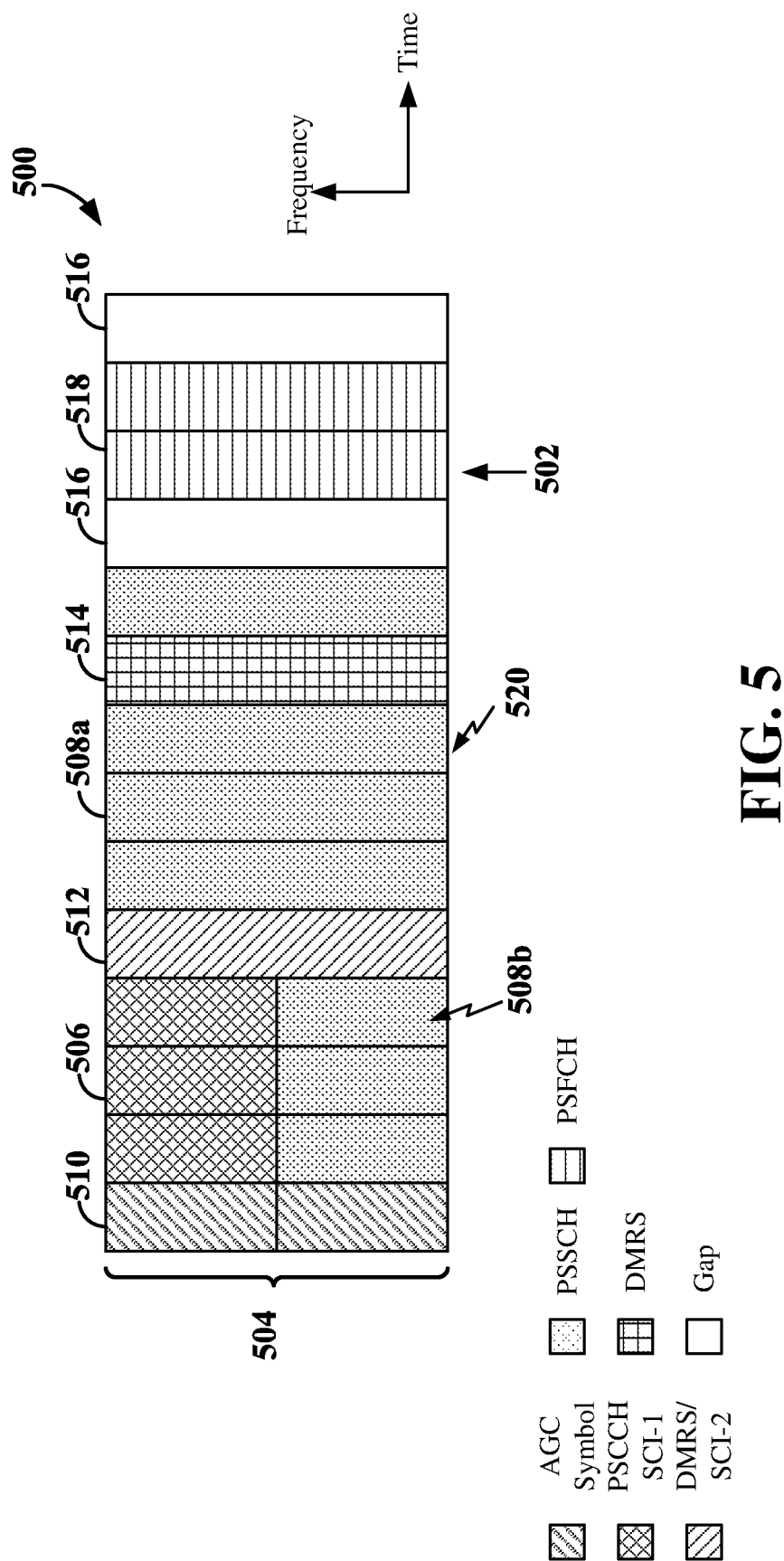
FIG. 5 is a diagram illustrating an example of a sidelink slot structure with feedback resources according to some aspects.

FIG. 5 is a diagram illustrating an example of a sidelink slot structure with feedback resources according to some aspects. The sidelink slot structure may be utilized, for example, in a V2X or other D2D network implementing sidelink In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region 520 of the slot 500. The PSCCH 506 and PSSCH 508 are each transmitted on one or more symbols 502 of the slot 500. The PSCCH 506 includes, for example, SCI-1 that schedules transmission of data traffic (e.g., a packet) on time-frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508a that is TDMed with the PSCCH 506 and a second portion 508b that is FDMed with the PSCCH 506.

The PSSCH 508 may further include DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508b may be transmitted on both the first symbol and the second symbol.

For unicast and/or groupcast transmissions, HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500. A gap symbol 516 may further be placed after the PSFCH symbols 518.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

To establish timing in a sidelink network without the assistance of a base station, such as a Mode 2 network or a sidelink network operating in an unlicensed band (SL-U), a UE (e.g., an anchor UE) may broadcast sidelink SSBs (S-SSBs). For example, S-SSBs may carry the system frame number, slot index, slot timing, symbol timing, and subcarrier spacing to use for communications over a sidelink The S-SSB may further provide a time division duplex (TDD) configuration of the sidelink network. Once timing has been established, the UEs may discover the resource pool (RP) configuration for sidelink communications in the sidelink network. Based on the RP configuration, radio resource control (RRC) message exchanges between sidelink devices may occur.

The RP configuration may include, for example, a sidelink resource block (RB) set configuration that identifies a set of one or more RB sets on which the Tx UE may communicate, along with the starting and ending RBs of guard bands between the RB sets. Here, each RB set may include approximately 50 RBs for a subcarrier spacing (SCS) of 30 kHz (resulting in a 20 MHz bandwidth (BW)) within a sub-band of a configured bandwidth part (BWP). For example, the configured BWP part may include a plurality of sub-bands, and the RP configuration may indicate the RB set configuration of each of the sub-bands. Within one RB set (e.g., 20 MHz bandwidth), there may be, for example, five interlaces or some configurable number of sub-channels over which UEs may communicate. Thus, the RP configuration may further indicate the PSCCH, PSSCH, and PSFCH configuration. For example, the RP configuration may further indicate the number of sub-channels, the PSCCH size, the PSFCH bandwith (BW) and the periodicity of sidelink communications.

Different UEs may support different RP configurations. For example, the Tx UE may have an RB set configuration that includes a first set of RBs and defines first guard bands for a first sub-band of a configured BWP, whereas a receiving UE (Rx UE) may have an RB set configuration that includes a second set of RBs and defines second guard bands for the first sub-band. The first set of RBs and the second set of RBs may only partially overlap (e.g., there may be one or more RBs on the edges that are different between the first set of RBs and the second set of RBs). In addition, the first set of guard bands and the second set of guard bands may not be the same. For example, one of the UEs may use smaller guard bands than the other. Since the frequency domain resource allocation (FDRA) interpretation depends on the RB set configuration, for a Tx UE and Rx UE with different RB set configurations, the PSSCH decoding may fail if the Rx UE does not have knowledge of the Tx UE RB set configuration (e.g., the Tx UE may transmit on edge RBs that are not included in the Rx UE's RP configuration or within the Rx UEs guard band). Moreover, the Tx UE may not know where to transmit the SCI-1 and SCI-2 so that Rx UEs with different RB set configurations can decode them.

Therefore, in various aspects of the disclosure, a minimum RB set configuration may be defined that is common to all UEs to enable communication of the RP configuration and other sidelink transmissions between the UEs without prior knowledge of the RP configuration of each of the UEs. The minimum RB set configuration may be pre-configured on the UEs (e.g., by the original equipment manufacturer (OEM) based on one or more standards or specifications) or provided by a base station. The minimum RB set configuration may include a minimum set of RBs among all possible RB set configurations per 20 MHz channel, so that the Tx UE and Rx UE each have a common understanding of the FDRA (e.g., the usable RBs) within each 20 MHz channel. Thus, the minimum RB set configuration may include the intersection of all of the possible RB set configurations.

Figure 6:
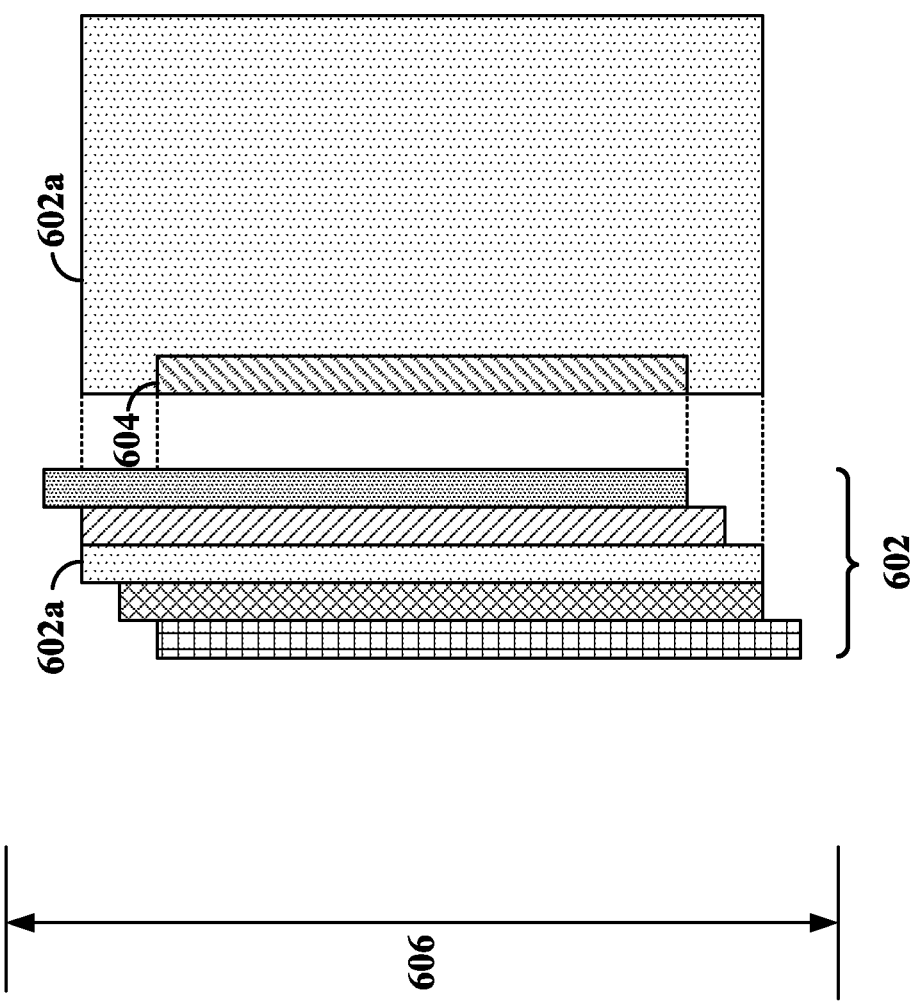
FIG. 6 is a diagram illustrating an example of resource block (RB) set configurations and a minimum RB set configuration according to some aspects.

FIG. 6 is a diagram illustrating an example of RB set configurations and a minimum RB set configuration according to some aspects. In the example shown in FIG. 6, within a sub-band 606 (e.g., a 20 MHz channel of a 100 MHz BWP), there are five possible RB set configurations 602 illustrated. The intersection of all of the possible RB set configurations 602 representing the common RBs among all of the possible RB set configurations 602 forms the minimum RB set configuration 604. Sidelink communication between UEs may occur within the minimum RB set 604 prior to applying one of the RB set configurations (e.g., RB set configuration 602a) to sidelink communications. For example, in various aspects of the disclosure, the minimum RB set 604 may be used by UEs to exchange their RP configurations for selection of an RP configuration (e.g., RB set configuration 602a) for sidelink communication therebetween.

Figure 7:
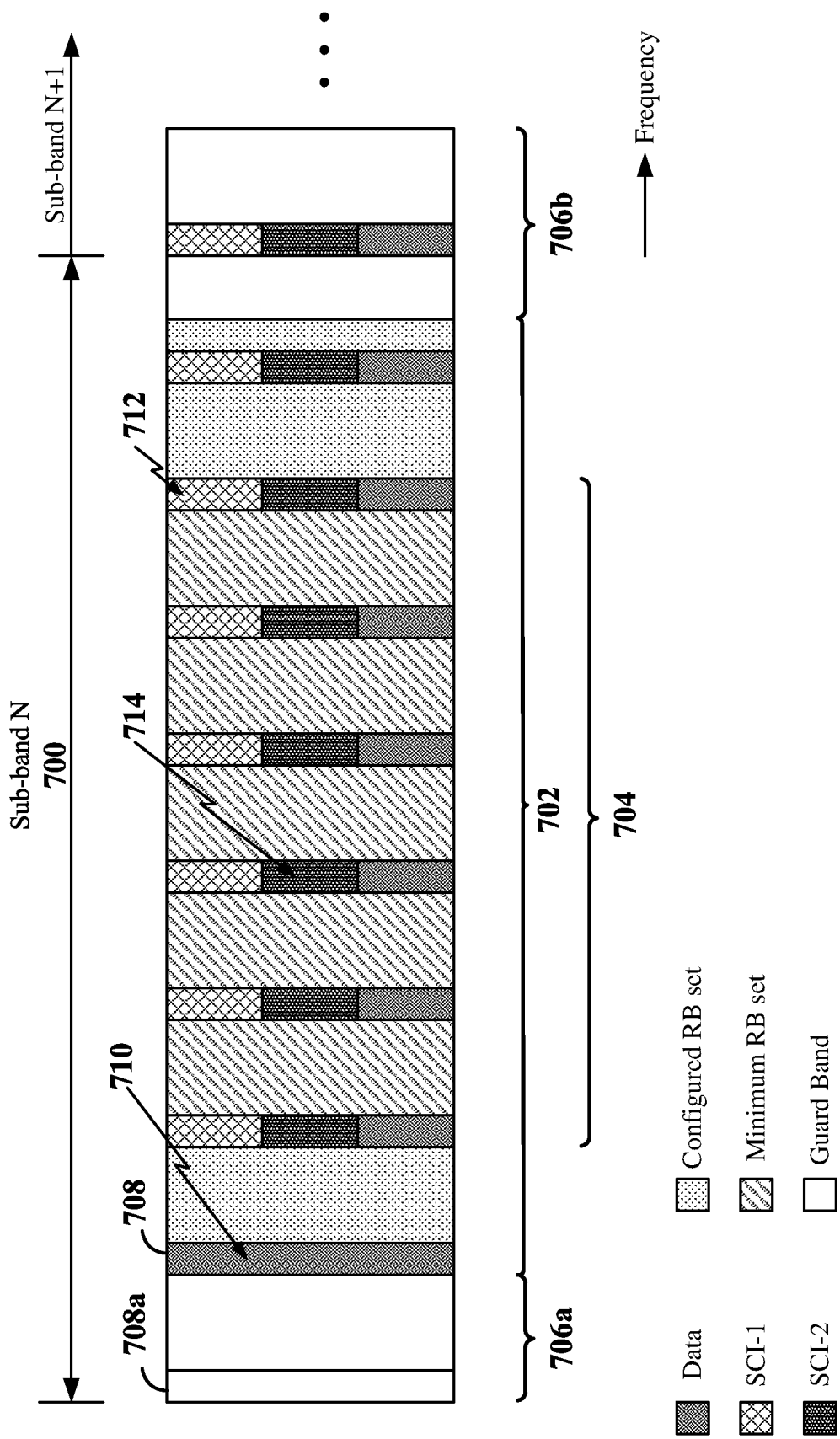
FIG. 7 is a diagram illustrating an example of an RB set configuration and minimum RB set configuration within a sub-band according to some aspects.

FIG. 7 is a diagram illustrating an example of an RB set configuration and minimum RB set configuration within a sub-band according to some aspects. In the example shown in FIG. 7, a BWP may include a plurality of sub-bands (e.g., sub-band N 700, sub-band N+1, etc.). Within a sub-band (e.g., sub-band N 700), a UE (e.g., a Tx UE) may have a configured RB set 702 that is used for forward link and/or reverse link communications with other UEs over a sidelink. In addition, a minimum RB set 704 may be configured that corresponds to the overlapping RBs between all possible RB set configurations (e.g., as shown in the example of FIG. 6). The PSCCH carrying SCI-1 712 is contained within the minimum RB set 704. Guard bands 706a and 706b may further be configured on either side of the configured RB set 702. Each of the guard bands 706a and 706b provides a gap between configured RB sets of the BWP. Within the BWP, there may be a number of interlaces 708 (subcarriers). Each interlace 708 may be used for sidelink communication between the Tx UE and one or more Rx UEs. In the example shown in FIG. 7, a first instance of an interlace 708a may be unused. Other instances of the interlace 708 may carry data 710 (e.g., PSSCH) and/or control information (e.g., SCI-1 712 within the PSCCH in the minimum RB set 704 and SCI-2 714 within the PSSCH in the minimum RB set 704 or the configured RB set 702). In addition, if a PSSCH is scheduled in sub-band N 700 and sub-band N+1, the SCI-2 714 may extend through the guard band 706b into sub-band N+1.

The Tx UE may communicate with one or more Rx UEs using the minimum RB set 704 prior to providing the RP configuration indicating the configured RB set 702 to the one or more Rx UEs. For example, the Tx UE may transmit SCI-1 712 and SCI-2 714 with rate matching confined within the minimum RB set 704 to ensure that decoding of SCI-1 712 and SCI-2 714 is decoupled from the choice of RB set configuration. In addition, the location of the PSCCH (SCI-1 712) is fixed within the minimum RB set 704 to support decoding even if an Rx UE does not receive the S-SSB from the Tx UE. The PSSCH 710 may further be rate-matched within the minimum RB set 704 prior to the Tx UE providing the RB set configuration 702 to the Rx UE (e.g., when the exact starting and ending RBs of the configured RB set 702 are unknown).

In various aspects of the disclosure, the Tx UE may transmit the RP configuration to the one or more Rx UEs within the minimum RB set 704 to facilitate switching from the minimum RB set 704 to the configured RB set 702 for subsequent sidelink transmissions. In some examples, the RP configuration of the Tx UE may enable selection of a wider bandwidth channel (e.g., greater than or equal to 40 MHz) involving two or more consecutive sub-bands. In this example, the Tx UE may transmit in the interlace 708 within the guard band 706b between the consecutive sub-bands (e.g., sub-band N and sub-band N+1). In various aspects of the disclosure, the Tx UE may transmit the RP configuration of the Tx UE to the one or more Rx UEs within the minimum RB set 704 via a remaining minimum system information (RMSI) message.

Figure 8:
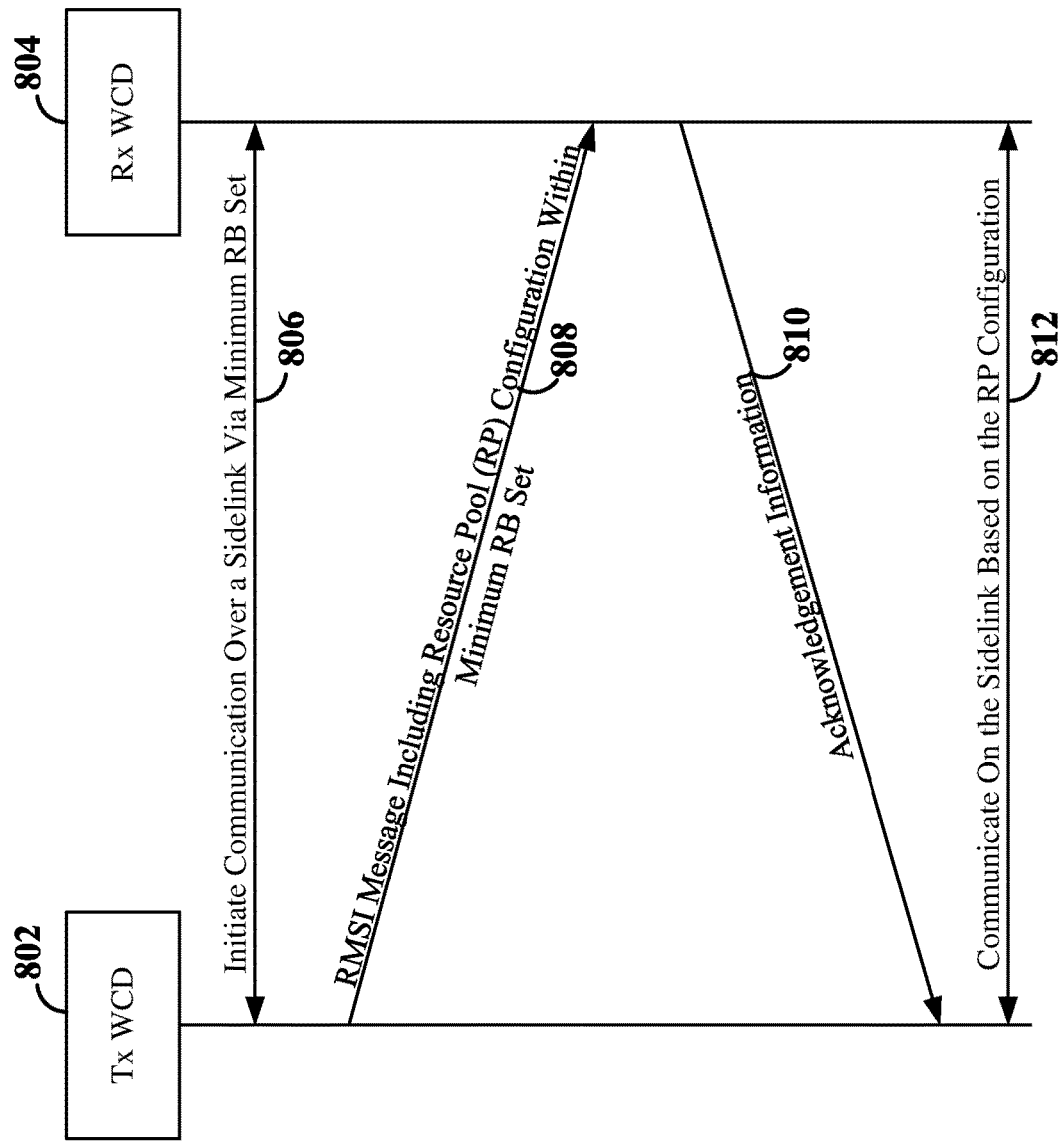
FIG. 8 is a diagram illustrating exemplary signaling of a remaining minimum system information (RMSI) message between a transmitting wireless communication device and a receiving wireless communication device according to some aspects.

FIG. 8 is a diagram illustrating exemplary signaling of an RMSI message between a transmitting (Tx) wireless communication device (WCD) (e.g., a UE) 802 and a receiving (Rx) WCD 804 according to some aspects. Each of the WCDs 802 and 804 may correspond, for example, to any of the UEs, sidelink devices, or other WCDs shown in any of FIGS. 1, 3, and/or 15.

At 806, the Tx WCD 802 and the Rx WCD 804 may initiate communication over a sidelink via a minimum RB set. The minimum RB set is common to both the Tx WCD 802 and the Rx WCD 804 and corresponds to the intersection of all possible RB set configurations. Proper timing on the sidelink (e.g., slot alignment) may be provided by a base station, the Tx WCD 802 or another WCD transmitting a S-SSB, or by a global positioning system (GPS) receiver (e.g., in examples in which the Rx WCD 804 does not receive the S-SSB from the Tx WCD or another WCD).

At 808, the Tx WCD 802 may transmit a dynamic (on-demand) RMSI message including the resource pool (RP) configuration of the Tx WCD 802 within the minimum RB set to at least one Rx WCD (e.g., including Rx WCD 804). The use of a dynamic RMSI message instead of a sidelink SIB or sidelink RRC message avoids the association of the RP configuration with a S-SSB transmission, since not all WCDs (sidelink devices) are capable of transmitting S-SSB. Thus, the dynamic RMSI message is not necessarily associated with an S-SSB transmission.

The RP configuration can include at least one of a forward link RP configuration and/or a reverse link RP configuration of the Tx WCD 802. The forward link RP configuration may be associated with sidelink transmissions from the Tx WCD 802, whereas the reverse link RP configuration may be associated with sidelink transmissions received by the Tx WCD 802. In some examples, the forward link RP configuration may be associated with a broadcast transmission or groupcast transmission from the Tx WCD 802 to the Rx WCD 804. In addition, the reverse link RP configuration may be associated with reception by the Tx WCD 802 of a unicast transmission from the Rx WCD 804.

In some examples, the RMSI message may be a broadcast message or a unicast message. For example, the Tx WCD 802 may broadcast the RMSI message containing the forward link RP configuration to potential groupcast or broadcast Rx WCDs (e.g., including the Rx WCD 804) to facilitate groupcast or broadcast transmission in a wider bandwidth than the minimum RB set and with better efficiency (e.g., more efficient use of the guard bands). Moreover, the Tx WCD 802 may broadcast or unicast the RMSI message containing the reverse link RP configuration to one or more potential transmitting WCDs (e.g., including the Rx WCD 804) to improve efficiency of unicast transmissions from the Rx WCD 804 (and other Rx WCDs) to the Tx WCD 802.

In some examples, the Tx UE 802 may not transmit a S-SSB prior to sending the RMSI message, but instead may send the RMSI message upon identifying another triggering event to transmit the RMSI message. In an example, the Tx WCD 802 may transmit the RMSI message to at least the Rx WCD 804 upon establishing a connection with the Rx WCD 804 (or with one or more Rx WCDs). For example, if the Tx WCD 802 determines that it has data to groupcast or broadcast to a plurality of Rx WCDs, the arrival of groupcast or broadcast data in the buffer of the Tx WCD 802 may trigger the Tx WCD 802 to transmit (e.g., groupcast or broadcast) the dynamic RMSI message to the plurality of Rx WCDs (e.g., a group of two or more Rx WCDs). In another example, the Tx WCD 802 may be configured with a periodicity of RMSI message transmissions. In this example, the Tx WCD 802 may be triggered to transmit the dynamic RMSI message periodically based on the configured periodicity. Periodic RMSI message transmissions may facilitate broadcasting or groupcasting in environments in which new potential Rx WCDs may enter an area surrounding the Tx WCD 802.

At 810, the Rx WCD 804 may transmit acknowledgement information to the Tx WCD 802. In examples in which the RMSI message is a unicast message, the acknowledgement information may carry an acknowledgement (ACK) or a negative acknowledgement (NACK) indicating whether the Rx WCD 804 successfully received and decoded the RMSI message. In examples in which the RMSI message is a broadcast or groupcast message, the acknowledgement information may carry only a NACK from those Rx WCDs (e.g., at least Rx WCD 804) that were unable to successfully receive and decode the RMSI message. In this example, the acknowledgement information (NACK) from each of the Rx WCDs may be transmitted together within a single PSFCH resource (e.g., that is selected based on a pre-configured mapping between the PSSCH carrying the RMSI message and the corresponding PSFCH resource).

At 812, the Tx WCD 802 and Rx WCD 804 may communicate on the sidelink based on the RP configuration of the Tx WCD 802. By using the RP configuration for sidelink communication, edge RBs and all of the configured RB sets may be used, which results in more efficient communication between the Tx WCD 802 and the Rx WCD 804. For example, the Tx WCD 802 may transmit one or more sidelink transmissions to at least the Rx WCD 804 using any of the available RB sets and RBs within the RB sets of the RP configuration. In this example, the Tx WCD 802 may indicate the selected RB set(s) (and RBs within the selected RB sets(s)) in the SCI-1 scheduling the sidelink transmission.

Figure 9:
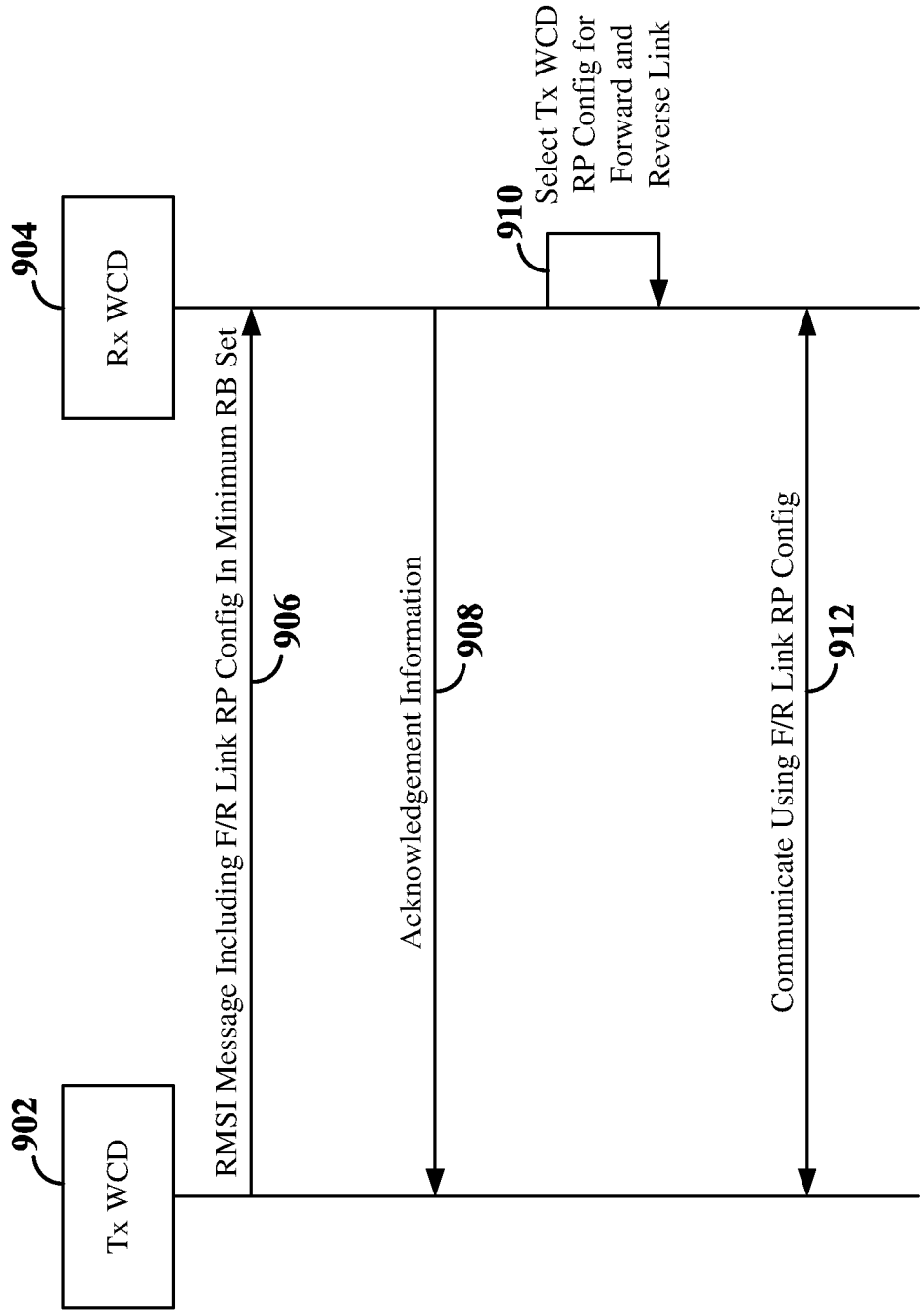
FIG. 9 is a signaling diagram illustrating other exemplary signaling of an RMSI message between a transmitting wireless communication device and a receiving wireless communication device according to some aspects.

FIG. 9 is a signaling diagram illustrating other exemplary signaling of an RMSI message between a transmitting (Tx) wireless communication device (WCD) (e.g., a UE) 902 and a receiving (Rx) WCD 904 according to some aspects. Each of the WCDs 902 and 904 may correspond, for example, to any of the UEs, sidelink devices, or other WCDs shown in any of FIGS. 1, 3, and/or 15.

At 906, the Tx WCD 902 may transmit a dynamic (on-demand) RMSI message including the resource pool (RP) configuration of the Tx WCD 902 within a minimum RB set to at least one Rx WCD (e.g., including Rx WCD 904). The RP configuration can include a forward link RP configuration and a reverse link RP configuration of the Tx WCD 902. The forward link RP configuration may be associated with sidelink transmissions from the Tx WCD 902, whereas the reverse link RP configuration may be associated with sidelink transmissions received by the Tx WCD 902.

At 908, the Rx WCD 904 may transmit acknowledgement information to the Tx WCD 902. In examples in which the RMSI message is a unicast message, the acknowledgement information may carry an acknowledgement (ACK) or a negative acknowledgement (NACK) of the RMSI message. In examples in which the RMSI message is a broadcast or groupcast message, the acknowledgement information may carry a NACK from one or more Rx WCDs (e.g., at least Rx WCD 904) of the RMSI message in a single sidelink feedback resource (e.g., a PSFCH resource).

At 910, the Rx WCD 904 may select the forward link RP configuration and reverse link RP configuration of the Tx WCD 902 for forward and reverse link sidelink communications with the Tx WCD 902. For example, the Tx WCD 902 may transmit a sidelink transmission to the Rx WCD 904 using the forward link RP configuration. In addition, the Rx WCD 904 may transmit a sidelink transmission to the Tx WCD 902 using the reverse link RP configuration. In some examples, the forward and reverse link RP configurations may be the same. In other examples, the forward and reverse link RP configurations may differ. In this example, the Tx WCD 902 may be an anchor WCD that provides the system parameters to other WCDs in the area within which the Tx WCD 902 is located.

At 912, the Tx WCD 902 and Rx WCD 904 may communicate on the sidelink using the forward link RP configuration and reverse link RP configuration of the Tx WCD 902. For example, the Tx WCD 902 may transmit one or more sidelink transmissions to at least the Rx WCD 904 using any of the available RB sets and RBs within the RB sets of the forward link RP configuration. In addition, the Rx WCD 904 may transmit one or more sidelink transmissions to the Tx WCD 902 using any of the available RB sets and RBs within the RB sets of the reverse link RP configuration.

Figure 10:
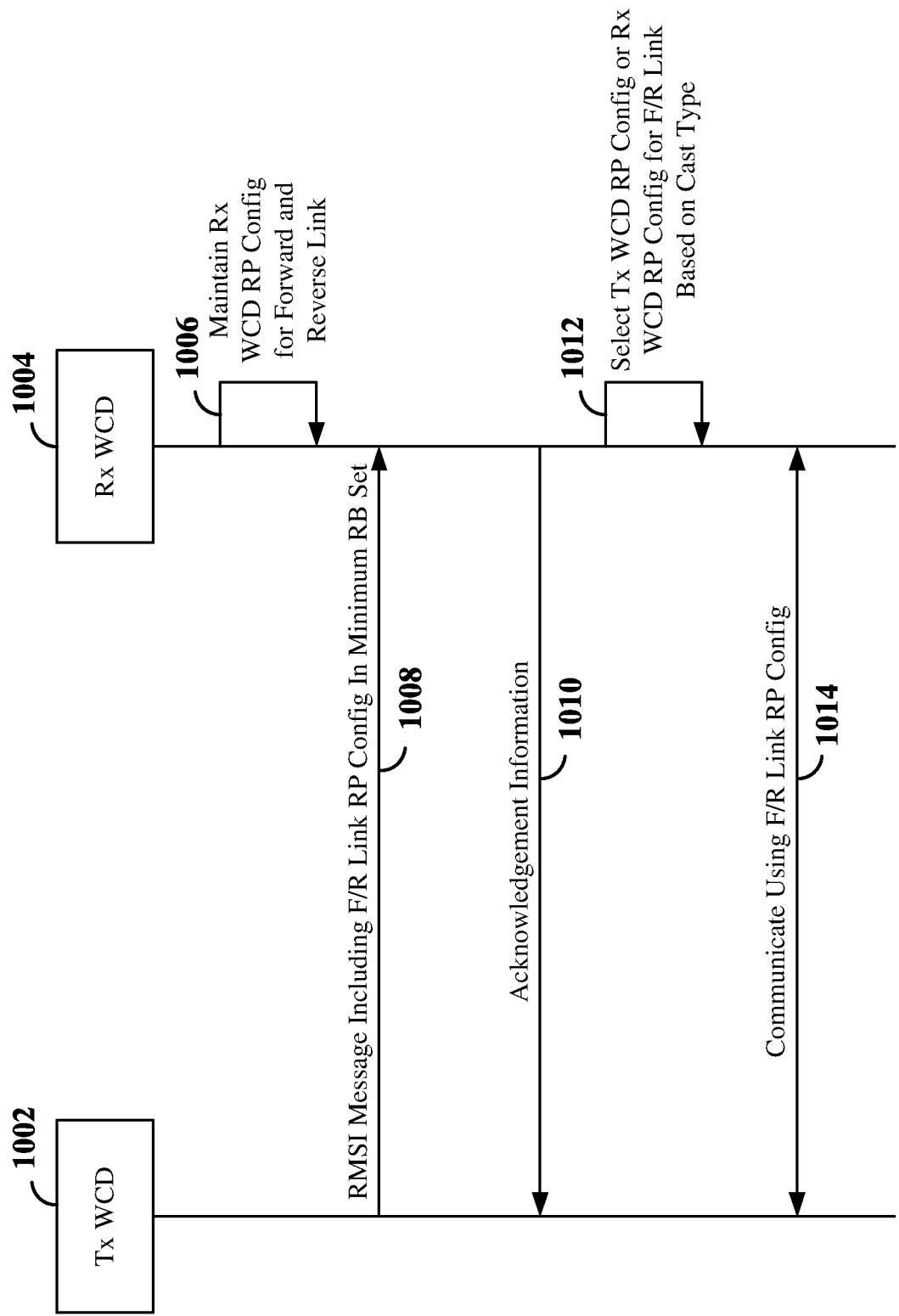
FIG. 10 is a signaling diagram illustrating other exemplary signaling of an RMSI message between a transmitting wireless communication device and a receiving wireless communication device according to some aspects.

FIG. 10 is a signaling diagram illustrating other exemplary signaling of an RMSI message between a transmitting (Tx) wireless communication device (WCD) (e.g., a UE) 1002 and a receiving (Rx) WCD 1004 according to some aspects. Each of the WCDs 1002 and 1004 may correspond, for example, to any of the UEs, sidelink devices, or other WCDs shown in any of FIGS. 1, 3, and/or 15.

At 1006, the Rx WCD 1004 may maintain a resource pool (RP) configuration of the Rx WCD 1004. The RP configuration of the Rx WCD 1004 may include a forward link RP configuration and a reverse link configuration. The forward link RP configuration may be associated with sidelink transmissions from the Rx WCD 1004, whereas the reverse link RP configuration may be associated with sidelink transmissions received by the Rx WCD 1004.

At 1008, the Tx WCD 1002 may transmit a dynamic (on-demand) RMSI message including the resource pool (RP) configuration of the Tx WCD 1002 within a minimum RB set to at least one Rx WCD (e.g., including Rx WCD 1004). The RP configuration can include a forward link RP configuration and a reverse link RP configuration of the Tx WCD 1002. The forward link RP configuration may be associated with sidelink transmissions from the Tx WCD 1002, whereas the reverse link RP configuration may be associated with sidelink transmissions received by the Tx WCD 1002.

At 1010, the Rx WCD 1004 may transmit acknowledgement information to the Tx WCD 1002. In examples in which the RMSI message is a unicast message, the acknowledgement information may carry an acknowledgement (ACK) or a negative acknowledgement (NACK) of the RMSI message. In examples in which the RMSI message is a broadcast or groupcast message, the acknowledgement information may carry a NACK from one or more Rx WCDs (e.g., at least Rx WCD 1004) of the RMSI message in a single sidelink feedback resource (e.g., a PSFCH resource).

At 1012, the Rx WCD 1004 may select either the Rx WCD RP configuration or the Tx WCD RP configuration for each of the forward link (sidelink transmissions from the Tx WCD 1002 to the Rx WCD 1004) and the reverse link (sidelink transmissions from the Rx WCD 1004 to the Tx WCD 1002). In some examples, the Rx WCD 1004 may select a respective RP configuration for the forward and reverse links based on a cast type of sidelink communications therebetween. In an example, the Rx WCD 1004 may select the Tx WCD forward link RP configuration for broadcast communications from the Tx WCD 1002. The Rx WCD 1004 may further select either the Tx WCD reverse link RP configuration for unicast transmissions from the Tx WCD 1002 or the Rx WCD reverse link RP configuration for unicast communications from the Tx WCD 1002. In examples in which the Rx WCD reverse link RP configuration is selected for unicast communications, the Rx WCD 1004 may provide the RP configuration of the Rx WCD 1004 to the Tx WCD 1002. For example, the Rx WCD 1004 may broadcast or unicast an RMSI message including the Rx WCD RP configuration to at least the Tx WCD 1002. In some examples, the Rx WCD 1004 may transmit the RMSI message to the Tx WCD 1002 in response to a request from the Tx WCD 1002 for the Rx WCD RP configuration.

At 1014, the Tx WCD 1002 and Rx WCD 1004 may communicate over the sidelink using the selected RP configurations for each of the forward link and the reverse link based on the cast type. For example, the Tx WCD 1002 may broadcast one or more sidelink transmissions to at least the Rx WCD 1004 using the Tx WCD forward link RP configuration. In addition, the Tx WCD 1002 may unicast one or more sidelink transmissions to the Rx WCD 1004 using the Rx WCD reverse link RP configuration. Furthermore, the Tx WCD 1002 may receive one or more unicast sidelink transmissions from the Rx WCD 1004 using the Tx WCD reverse link RP configuration.

Figure 11:
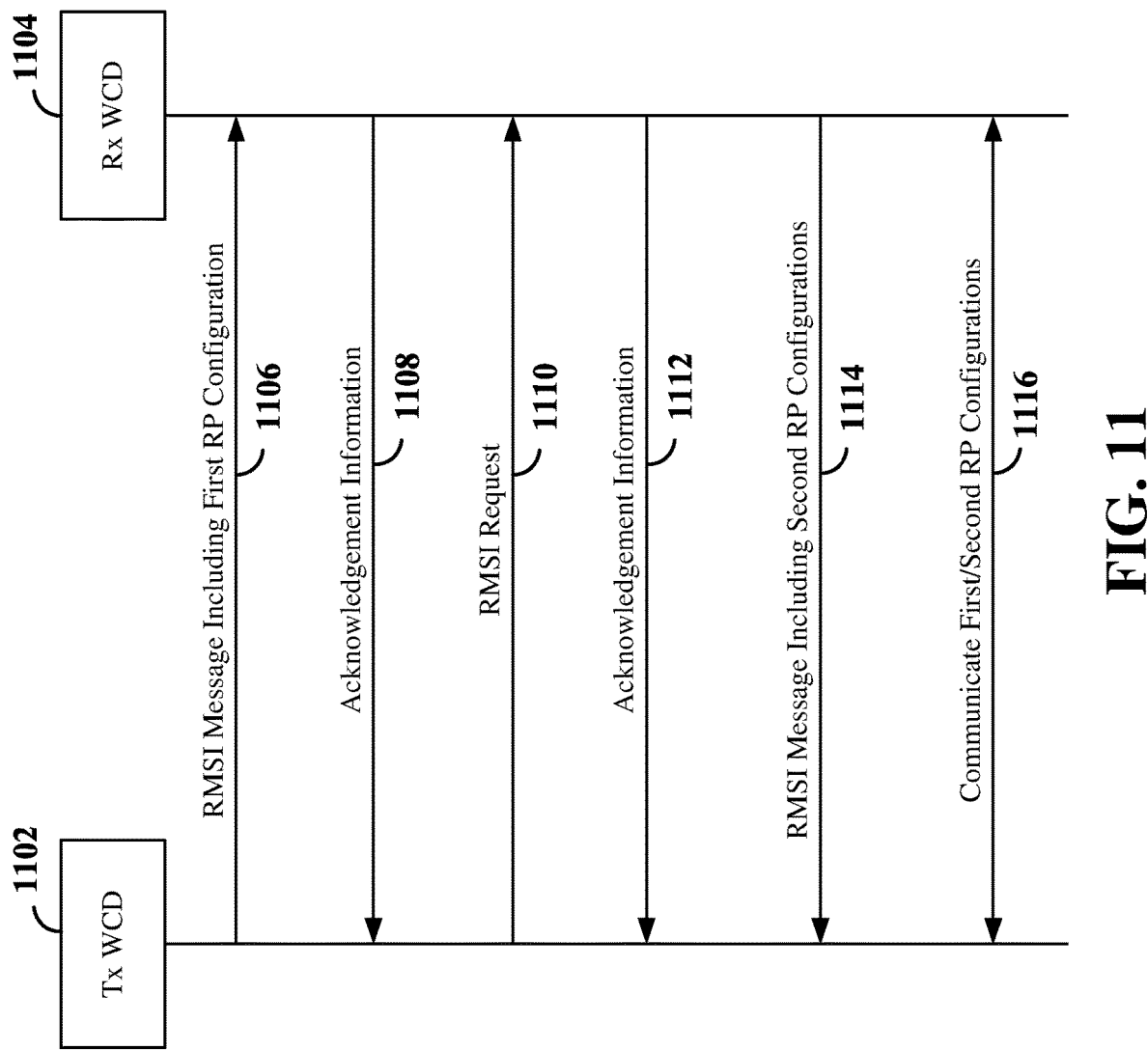
FIG. 11 is a signaling diagram illustrating other exemplary signaling of an RMSI message between a transmitting wireless communication device and a receiving wireless communication device according to some aspects.

FIG. 11 is a signaling diagram illustrating other exemplary signaling of an RMSI message between a transmitting (Tx) wireless communication device (WCD) (e.g., a UE) 1102 and a receiving (Rx) WCD 1104 according to some aspects. Each of the WCDs 1102 and 1104 may correspond, for example, to any of the UEs, sidelink devices, or other WCDs shown in any of FIGS. 1, 3, and/or 15.

At 1106, the Tx WCD 1102 may transmit a dynamic (on-demand) RMSI message including the resource pool (RP) configuration of the Tx WCD 1102 (e.g., a first RP configuration) within a minimum RB set to at least one Rx WCD (e.g., including Rx WCD 1104). The RP configuration can include a forward link RP configuration and a reverse link RP configuration of the Tx WCD 1102. The forward link RP configuration may be associated with sidelink transmissions from the Tx WCD 1102, whereas the reverse link RP configuration may be associated with sidelink transmissions received by the Tx WCD 1102.

At 1108, the Rx WCD 1104 may transmit acknowledgement information to the Tx WCD 1102. In examples in which the RMSI message is a unicast message, the acknowledgement information may carry an acknowledgement (ACK) or a negative acknowledgement (NACK) of the RMSI message. In examples in which the RMSI message is a broadcast or groupcast message, the acknowledgement information may carry a NACK from one or more Rx WCDs (e.g., at least Rx WCD 1104) of the RMSI message in a single sidelink feedback resource (e.g., a PSFCH resource).

At 1110, the Tx WCD 1102 may transmit a request to the Rx WCD 1104 for the RP configuration of the Rx WCD (e.g., second RP configuration) to trigger the transmission of a dynamic RMSI message including the second RP configuration by the Rx WCD 1104. In some examples, the request may be transmitted within SCI-2 of another sidelink message. For example, the sidelink message may be a unicast message, a groupcast message, or a broadcast message. In examples in which the sidelink message is a unicast message, the sidelink message may be transmitted within the minimum RB set. In examples in which the sidelink message is a groupcast or broadcast message, the sidelink message may be transmitted within the minimum RB set or using the first RP configuration (e.g., within one or more RB sets of the first RP configuration).

At 1112, the Rx WCD 1104 may transmit acknowledgement information to the Tx WCD 1102. In examples in which the sidelink message including the request for the second RP configuration of the Rx WCD 1104 is a unicast message, the acknowledgement information may carry an acknowledgement (ACK) or a negative acknowledgement (NACK) of the sidelink message. In examples in which the sidelink message is a broadcast or groupcast message, the acknowledgement information may carry a NACK from one or more Rx WCDs (e.g., at least Rx WCD 1104) of the sidelink message in a single sidelink feedback resource (e.g., a PSFCH resource).

At 1114, the Rx WCD 1104 may transmit a dynamic (on-demand) RMSI message including the resource pool (RP) configuration of the Rx WCD 1104 (e.g., the second RP configuration) to at least the Tx WCD 1102. The second RP configuration can include a forward link RP configuration and a reverse link RP configuration of the Rx WCD 1104. The forward link RP configuration may be associated with sidelink transmissions from the Rx WCD 1104, whereas the reverse link RP configuration may be associated with sidelink transmissions received by the Rx WCD 1104. The RMSI message may be a unicast message, broadcast message, or groupcast message transmitted by the Rx WCD within the minimum RB set. For example, the RMSI may be groupcast or broadcast to the Tx WCD 1102 and other potential Tx WCDs or unicast to the Tx WCD 1102 that requested the second RP configuration. In some examples, the request for the second RP configuration sent by the Tx WCD 1102 may indicate that the Rx WCD 1104 should send a unicast RMSI message to the Tx WCD 1102. The Tx WCD 1102 may store the second RP configuration, along with the RP configurations of other potential Rx WCDs for subsequent sidelink communication therewith.

At 1116, the Tx WCD 1102 and Rx WCD 1104 may communicate over the sidelink using at least one of the first and second RP configurations. For example, the Tx WCD 1102 may broadcast one or more sidelink transmissions to at least the Rx WCD 1104 using the Tx WCD forward link RP configuration. In addition, the Tx WCD 1102 may unicast one or more sidelink transmissions to the Rx WCD 1104 using the Rx WCD reverse link RP configuration. Furthermore, the Tx WCD 1102 may receive one or more unicast sidelink transmissions from the Rx WCD 1104 using the Tx WCD reverse link RP configuration.

FIG. 12 is a diagram illustrating an exemplary resource pool (RP) configuration 1200 according to some aspects. The RP configuration 1200 includes a sidelink bandwidth part (BWP) configuration 1202 and a sidelink resource block (RB) set configuration 1204 associated with the sidelink BWP configuration 1202. The sidelink BWP configuration 1202 includes an offsetToPointA parameter 1206 that indicates a frequency offset between a common reference point for resource block grids (hereinafter referred to as Point A) and the lowest subcarrier of the lowest resource block of the S-SSB. The offsetToPointA may be expressed in units of resource blocks (RBs). The sidelink BWP configuration 1202 further includes a starting RB 1208 and bandwidth 1210 of a BWP of a carrier used for sidelink communication. In 5G, a carrier bandwidth may be up to 100 MHz in frequency range 1 (FR1: 450 MHz to 6 GHz) or up to 400 MHz in frequency range 2 (FR2: 24.25 GHz to 52.6 GHz) that can be aggregated with a maximum bandwidth of 800 MHz. With BWPs, the carrier can be subdivided and used for different purposes by different devices.

The sidelink RB set configuration 1204 includes a set of one or more RB sets 1212 configured for sidelink communication by a wireless communication device, a respective starting RB 1214 of each of a plurality of guard bands between respective ones of the one or more RB sets, and a respective ending RB 1216 of each of the plurality of guard bands. The RP configuration 1200 may further include additional configuration information. For example, the RP configuration 1200 may indicate the PSCCH, PSSCH, and PSFCH configuration. For example, the RP configuration may indicate the number of sub-channels, the PSCCH size, the PSFCH bandwith (BW) and the periodicity of sidelink communications.

In some examples, a wireless communication device may maintain multiple RP configurations 1200. In this example, one or more of the RP configurations 1200 may be group-specific. For example, a transmitting wireless communication device may maintain a group RP configuration 1200 for a group of receiving wireless communication devices that only supports a single 20 MHz subband. To accommodate group-specific RP configurations, a group identifier (ID) identifying the specific group of receiving wireless communication devices may be included in the RMSI message carrying the group-specific RP configuration or within SCI-2 scheduling the RMSI message. By including the group ID within the RMSI message, multiple group-specific RP configurations may be sent in a single RMSI message.

Figure 13A:
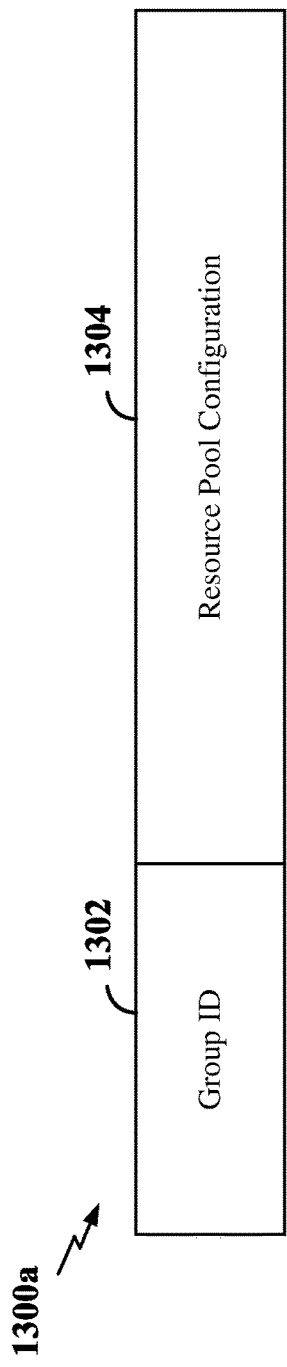
FIGS. 13A and 13B are diagrams illustrating examples of RMSI messages for group-specific RP configurations according to some aspects.
Figure 13B:
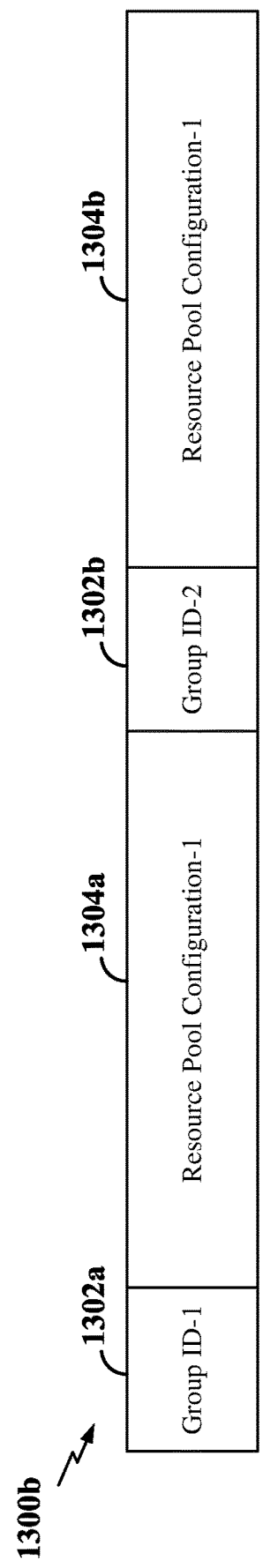

FIGS. 13A and 13B are diagrams illustrating examples of RMSI messages 1300a and 1300b for group-specific RP configurations according to some aspects. In the example shown in FIG. 13A, the RMSI message 1300a includes a group-specific RP configuration 1304 associated, for example, with a group of receiving wireless communication devices. In addition, a group identifier (ID) 1302 of the group of receiving wireless communication devices is included within the RMSI message 1300a. In the example shown in FIG. 13B, the RMSI message 1300b includes a plurality of group-specific RP configurations 1304a and 1304b, each associated with a respective group of wireless communication devices. In addition, the RMSI message 1300b includes a respective group ID 1302a and 1302b identifying each of the respective groups of receiving wireless communication devices.

Figure 14:
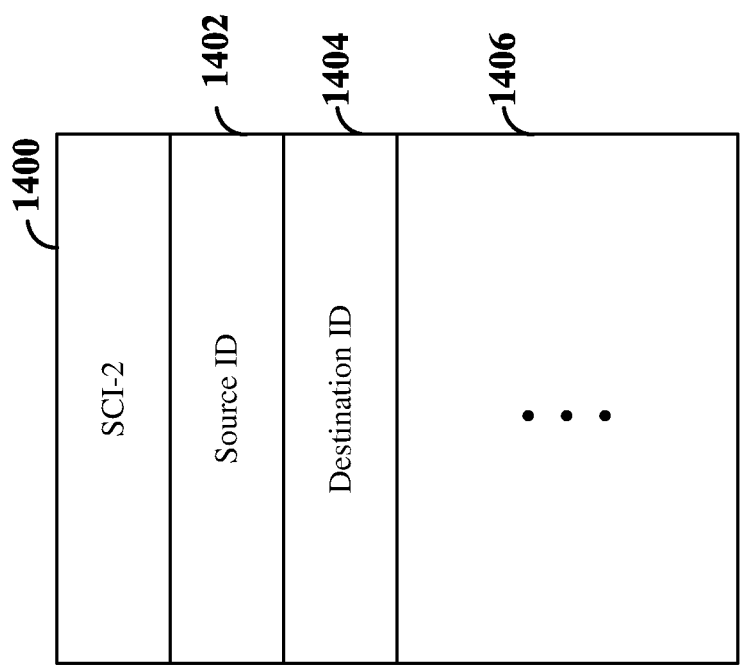
FIG. 14 is a diagram illustrating an example of second stage sidelink control information (SCI-2) scheduling an RMSI message according to some aspects.

FIG. 14 is a diagram illustrating an example of second stage sidelink control information (SCI-2) 1400 scheduling an RMSI message according to some aspects. The SCI-2 1400 includes a source identifier (ID) 1402 identifying a source of the RMSI message (e.g., the Tx WCD). In addition, the SCI-2 1400 includes a destination ID 1404 identifying a destination of the RMSI message. In some examples, the destination ID 1404 may be a group ID identifying a group of receiving wireless communication devices. In other examples, the destination ID 1404 may include the UE-ID of the Rx-WCD for unicast RMSI messages. The SCI-2 1400 may further include other information 1406 associated with the RMSI message. For example, the SCI-2 may include a HARQ process ID, a new data indicator (NDI), and a redundancy version (RV). For unicast communications, SCI-2 may further include a CSI report trigger. For groupcast communications, SCI-2 may further include a zone identifier and a maximum communication range for NACK.

Figure 15:
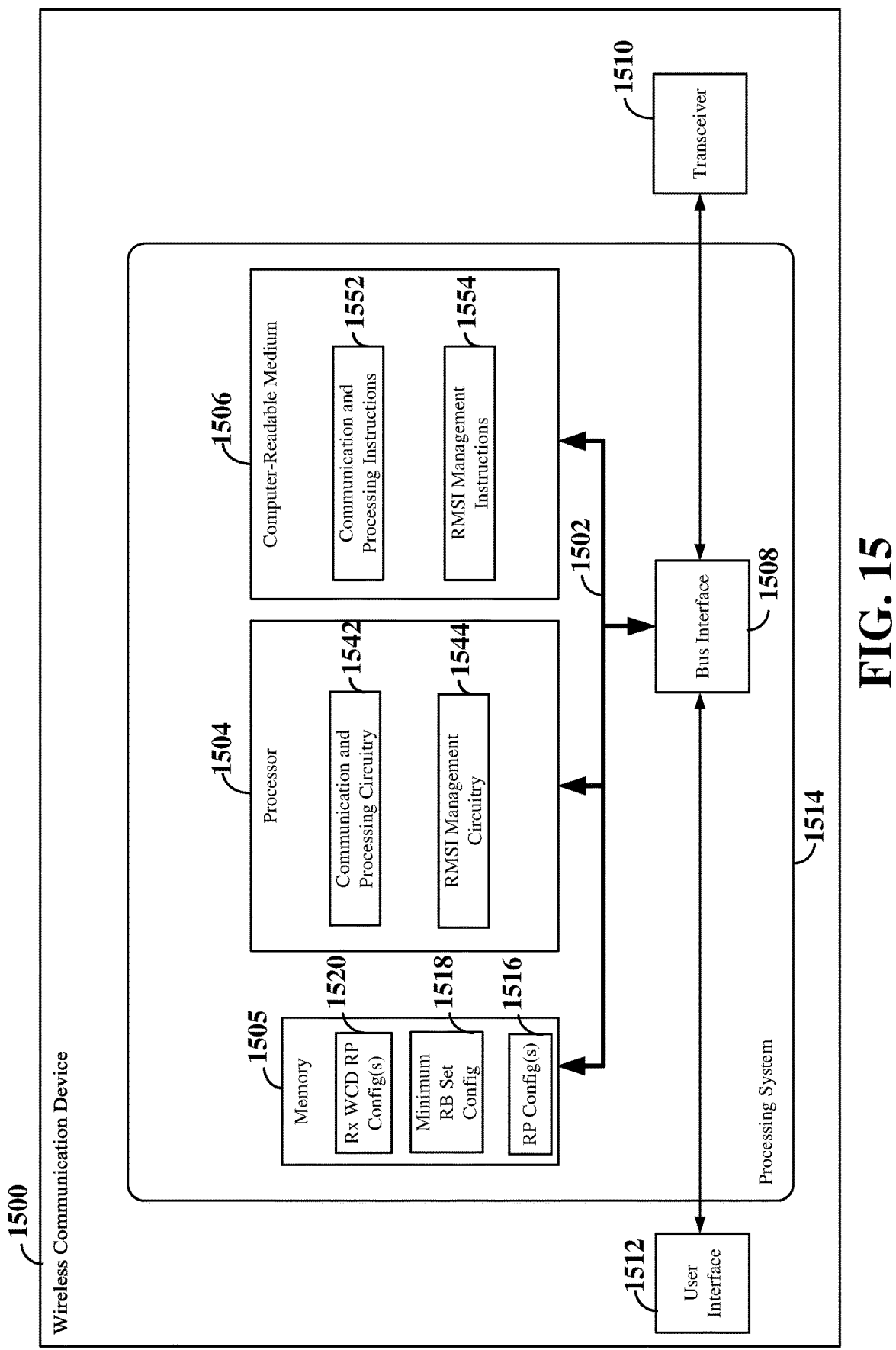
FIG. 15 is a block diagram illustrating an example of a hardware implementation for a wireless communication device employing a processing system according to some aspects.

FIG. 15 is a block diagram illustrating an example of a hardware implementation for a wireless communication device 1500 employing a processing system 1514. For example, the wireless communication device 1500 may correspond to a sidelink device, such as a V2X device, D2D device or other UE or wireless communication device configured for sidelink communication, as shown and described above in reference to FIGS. 1 and/or 3.

The wireless communication device 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1500 may be configured to perform any one or more of the functions described herein. That is, the processor 1504, as utilized in the wireless communication device 1500, may be used to implement any one or more of the processes and procedures described below.

The processor 1504 may in some instances be implemented via a baseband or modem chip and in other implementations, the processor 1504 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 links together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further.

A bus interface 1508 provides an interface between the bus 1502 and a transceiver 1510. The transceiver 1510 provides a communication interface or a means for communicating with various other apparatus over a transmission medium (e.g., air interface). Depending upon the nature of the apparatus, a user interface 1512 (e.g., keypad, display, touch screen, speaker, microphone, control knobs, etc.) may also be provided. Of course, such a user interface 1512 is optional, and may be omitted in some examples.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software. For example, the memory 1505 may store one or more of resource pool (RP) configuration(s) 1516 of the wireless communication device 1500, a minimum resource block (RB) set configuration 1518, and/or RP configuration(s) 1520 of one or more receiving wireless communication devices (Rx WCDs), which may be used by the processor 1504 in generating and processing sidelink transmissions. Each of the RP configuration(s) 1516 and the Rx WCD RP configuration(s) 1520 may include, for example, a sidelink bandwidth part configuration and a sidelink RB set configuration associated with the sidelink bandwidth part configuration. The sidelink RB set configuration may include, for example, a set of one or more RB sets, a respective starting RB of each of a plurality of guard bands between respective ones of the one or more RB sets, and a respective ending RB of each of the plurality of guard bands. The RP configurations 1516 and 1520 may further indicate the PSCCH, PSSCH, and PSFCH configuration. For example, the RP configuration may further indicate the number of sub-channels, the PSCCH size, the PSFCH bandwith (BW) and the periodicity of sidelink communications.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. In some examples, the computer-readable medium 1506 may be part of the memory 1505. Those skilled in the art will recognize how best to implement the described functionality presented throughout this disclosure depending on the particular application and the overall design constraints imposed on the overall system. In some examples, the computer-readable medium 1506 may be implemented on an article of manufacture, which may further include one or more other elements or circuits, such as the processor 1504 and/or memory 1505.

In some aspects of the disclosure, the processor 1504 may include circuitry configured for various functions. For example, the processor 1504 may include communication and processing circuitry 1542, configured to communicate with one or more sidelink devices (e.g., other wireless communication devices) via respective sidelinks (e.g., PC5 interfaces). In addition, the communication and processing circuitry 1542 may be configured to communicate with a network entity (e.g., a base station, such as a gNB or eNB) via a Uu link In some examples, the communication and processing circuitry 1542 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1542 may include one or more transmit/receive chains.

In some implementations where the communication involves receiving information, the communication and processing circuitry 1542 may obtain information from a component of the wireless communication device 1500 (e.g., from the transceiver 1510 that receives the information via radio frequency signaling or some other type of signaling suitable for the applicable communication medium), process (e.g., decode) the information, and output the processed information. For example, the communication and processing circuitry 1542 may output the information to another component of the processor 1504, to the memory 1505, or to the bus interface 1508. In some examples, the communication and processing circuitry 1542 may receive one or more of signals, messages, other information, or any combination thereof. In some examples, the communication and processing circuitry 1542 may receive information via one or more channels. In some examples, the communication and processing circuitry 1542 may include functionality for a means for receiving. In some examples, the communication and processing circuitry 1542 may include functionality for a means for processing, including a means for demodulating, a means for decoding, etc.

In some implementations where the communication involves sending (e.g., transmitting) information, the communication and processing circuitry 1542 may obtain information (e.g., from another component of the processor 1504, the memory 1505, or the bus interface 1508), process (e.g., modulate, encode, etc.) the information, and output the processed information. For example, the communication and processing circuitry 1542 may output the information to the transceiver 1510 (e.g., that transmits the information via radio frequency signaling or some other type of signaling suitable for the applicable communication medium). In some examples, the communication and processing circuitry 1542 may send one or more of signals, messages, other information, or any combination thereof. In some examples, the communication and processing circuitry 1542 may send information via one or more channels. In some examples, the communication and processing circuitry 1542 may include functionality for a means for sending (e.g., a means for transmitting). In some examples, the communication and processing circuitry 1542 may include functionality for a means for generating, including a means for modulating, a means for encoding, etc.

In some examples, the communication and processing circuitry 1542 may be configured to transmit a remaining minimum system information (RMSI) message including an RP configuration 1516 of the wireless communication device 1500 to at least one receiving wireless communication device. The communication and processing circuitry 1542 may further transmit the RMSI message within a minimum RB set based on the minimum RB set configuration 1518. In some examples, the RMSI message may be a unicast message. In other examples, the RMSI message may be a broadcast or groupcast message.

The communication and processing circuitry 1542 may further be configured to receive acknowledgement information from one or more of the receiving wireless communication devices. In examples in which the RMSI message is a unicast message, the acknowledgement information may include an acknowledgement or negative acknowledgement of the RMSI message from the receiving wireless communication device. In examples, in which the RMSI message is a broadcast or groupcast message, the acknowledgement information may include a negative acknowledgement of the RMSI message from one or more of the at least one receiving wireless communication device. In this example, the acknowledgement information may be received within a single sidelink feedback resource (e.g., a PSFCH resource).

The communication and processing circuitry 1542 may further receive an RMSI message (e.g., a second RMSI message) from a receiving wireless communication device (e.g., a first wireless communication device) of the at least one receiving wireless communication device. The second RMSI message may include an Rx WCD RP configuration 1520 of the first receiving wireless communication device. The second RMSI message may further be a unicast, broadcast, or groupcast message. In some examples, the communication and processing circuitry 1542 may be configured to transmit a request for the Rx WCD RP configuration 1520 to the first receiving wireless communication device. In some examples, the request may be transmitted within SCI-2 of a unicast, broadcast, or groupcast sidelink message. In some examples, the request may be transmitted within the minimum RB set. In some examples, the request may be transmitted to a group of receiving wireless communication devices including the first wireless communication device using the RP configuration 1516 of the wireless communication device 1500.

The communication and processing circuitry 1542 may further be configured to communicate with the at least one receiving wireless communication device based on the RP configuration 1516 of the wireless communication device 1500. In some examples, the communication and processing circuitry 1542 may be configured to communicate with the at least one receiving wireless communication device using the RP configuration 1516. In some examples, the RP configuration 1516 includes at least one of a forward link RP configuration associated with sidelink transmissions from the wireless communication device 1500 or a reverse link RP configuration associated with sidelink transmissions received by the wireless communication device. In this example, the communication and processing circuitry 1542 may use the forward link RP configuration for broadcast or groupcast transmissions from the wireless communication device 1500 to the at least one receiving wireless communication device. In addition, the communication and processing circuitry 1542 may use the reverse link RP configuration for reception of unicast transmissions from the first receiving wireless communication device.

In other examples, the communication and processing circuitry 1542 may be configured to communicate with the first receiving wireless communication device using at least one of the RP configuration 1516 or the Rx WCD RP configuration 1520. In this example, the communication and processing circuitry 1542 may be configured to communicate with the first wireless communication device using at least one of the RP configuration 1516 or the Rx WCD RP configuration 1520 based on a cast type of a sidelink transmission between the wireless communication device 1500 and the first receiving wireless communication device. The communication and processing circuitry 1542 may further be configured to execute communication and processing instructions (software) 1552 stored in the computer-readable medium 1506 to implement one or more of the functions described herein.

The processor 1504 may further include RMSI management circuitry 1544, configured to generate and process RMSI messages. The RMSI management circuitry 1544 may be configured to generate the RMSI message including the RP configuration 1516 for transmission by the communication and processing circuitry 1542 via the transceiver 1510 to the at least one receiving wireless communication device. For example, the RMSI management circuitry 1544 may generate the RMSI message upon the occurrence of a trigger event. In some examples, the trigger event may include establishing a connection to the at least one receiving wireless communication device over the minimum RB set. In other examples, the trigger event may include a periodicity parameter that provides a periodicity with which the RMSI message should be sent. For example, the RMSI management circuitry 1544 may generate a respective RMSI message at designated time intervals based on the periodicity parameter.

In some examples, the RMSI management circuitry 1544 may further be configured to operate together with the communication and processing circuitry 1542 to generate and transmit SCI-2 associated with (e.g., scheduling) the RMSI message. The SCI-2 can include a source identifier (ID) identifying the wireless communication device 1500 and a destination identifier (ID) identifying the at least one receiving wireless communication device. In examples in which the RMSI message is a unicast message, the destination ID identifies the destination (e.g., first) wireless communication device.

In some examples, the RP configuration(s) 1516 include one or more group RP configurations, each associated with a respective group of receiving wireless communication devices. In this example, the RMSI management circuitry 1544 may further be configured to operate together with the communication and processing circuitry 1542 to include a group identifier (ID) of a group of receiving wireless communication devices associated with a group RP configuration within either the RMSI message or within SCI-2 associated with (e.g., scheduling) the RMSI message. In some examples, the RMSI message may include multiple group RP configurations and a respective group ID of each of the group RP configurations.

The RMSI management circuitry 1544 may further be configured to receive and process the second RMSI message from the first receiving wireless communication device and to store the Rx WCD RP configuration 1520 within, for example, memory 1505. In addition, the RMSI management circuitry 1544 may further be configured to generate the request for the Rx WCD RP configuration 1520 for transmission by the communication and processing circuitry 1542 via the transceiver 1510. The RMSI management circuitry 1544 may further be configured to execute RMSI management instructions (software) 1554 stored in the computer-readable medium 1506 to implement one or more of the functions described herein.

Figure 16:
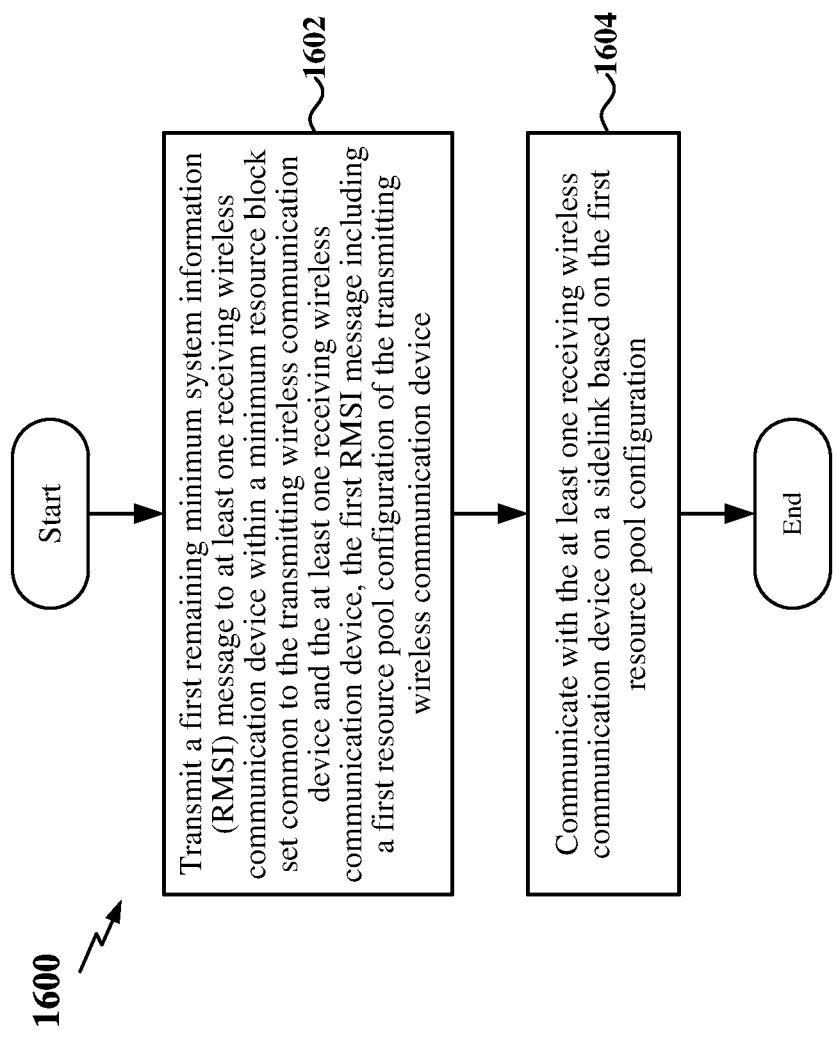
FIG. 16 is a flow chart of an exemplary process for RMSI transmission in sidelink according to some aspects.

FIG. 16 is a flow chart of an exemplary process 1600 for RMSI transmission in sidelink according to some aspects. As described below, some or all illustrated features may be omitted in a particular implementation within the scope of the present disclosure, and some illustrated features may not be required for implementation of all examples. In some examples, the method may be performed by the wireless communication device 1500, as described above and illustrated in FIG. 15, by a processor or processing system, or by any suitable means for carrying out the described functions.

At block 1602, the transmitting wireless communication device (e.g., a transmitting wireless communication device) may transmit a first remaining minimum system information (RMSI) message to at least one receiving wireless communication device within a minimum resource block set common to the transmitting wireless communication device and the at least one receiving wireless communication device. The first RMSI message includes a first resource pool configuration of the transmitting wireless communication device. In some examples, the first resource pool configuration includes at least one of a forward link resource pool configuration associated with sidelink transmissions from the transmitting wireless communication device or a reverse link resource pool configuration associated with sidelink transmissions received by the transmitting wireless communication device. In some examples, the forward link resource pool configuration is associated with a broadcast transmission or a groupcast transmission from the transmitting wireless communication device to the at least one receiving wireless communication device and the reverse link resource pool configuration is associated with reception of a unicast transmission from a first receiving wireless communication device of the at least one receiving wireless communication device.

In some examples, the first resource pool configuration includes a sidelink bandwidth part configuration and a sidelink resource block set configuration associated with the sidelink bandwidth part configuration. The sidelink resource block set configuration includes a set of one or more resource block sets, a respective starting resource block of each of a plurality of guard bands between respective ones of the one or more resource block sets, and a respective ending resource block of each of the plurality of guard bands.

In some examples, the first RMSI message is a unicast message. In this example, the transmitting wireless communication device may further receive acknowledgement information from the at least one receiving wireless communication device carrying an acknowledgement or a negative acknowledgement of the first RMSI message. In some examples, the RMSI message is a broadcast message or a unicast message. In this example, the transmitting wireless communication device may further receive acknowledgement information carrying a negative acknowledgement of the first RMSI message from one or more of the at least one receiving wireless communication device in a sidelink feedback resource.

In some examples, the first resource pool configuration is a first group resource pool configuration associated with a first group of receiving wireless communication devices. In this example, the transmitting wireless communication device may further include a group identifier of the first group of receiving wireless communication devices within the first RMSI message or within second stage sidelink control information associated with the first RMSI message. In some examples, the transmitting wireless communication device may further transmit a plurality of group resource pool configurations within the first RMSI. Each of the plurality of group resource pool configurations is associated with a respective one of a plurality of groups of receiving wireless communication devices. In addition, the transmitting wireless communication device may include a respective group identifier of each of the plurality of groups of receiving wireless communication devices within the first RMSI.

In some examples, the transmitting wireless communication device may further transmit second stage sidelink control information associated with the first RMSI message. The second stage sidelink control information including a source identifier identifying the transmitting wireless communication device and a destination identifier identifying the at least one receiving wireless communication device. In some examples, the transmitting wireless communication device may periodically transmit the first resource pool configuration to the at least one receiving wireless communication device. For example, the communication and processing circuitry 1542, together with the RMSI management circuitry 1544 and transceiver 1510, shown and described above in connection with FIG. 15, may provide a means to transmit the first RMSI message.

At block 1604, the transmitting wireless communication device may communicate with the at least one receiving wireless communication device on a sidelink based on the first resource pool configuration. In some examples, the transmitting wireless communication device may communicate with the at least one receiving wireless communication device using the first resource pool configuration.

In some examples, the transmitting wireless communication device may receive a second RMSI message from a first receiving wireless communication device of the at least one receiving wireless communication device. The second RMSI message includes a second resource pool configuration of the first receiving wireless communication device. In this example, the transmitting wireless communication device may communicate with the first receiving wireless communication device using at least one of the first resource pool configuration or the second resource pool configuration. In some examples, the transmitting wireless communication device may communicate with the first receiving wireless communication device using at least one of the first resource pool configuration or the second resource pool configuration based on a cast type of a sidelink transmission between the transmitting wireless communication device and the first receiving wireless communication device. In some examples, the second RMSI message is a unicast message, a broadcast message, or a groupcast message transmitted within the minimum resource block set.

In some examples, the transmitting wireless communication device may further transmit a request for the second resource pool configuration to the first receiving wireless communication device. In some examples, the transmitting wireless communication device may transmit the request for the second resource pool configuration within second stage sidelink control information of a sidelink message. The sidelink message may be a unicast message, groupcast message, or broadcast message. In some examples, the transmitting wireless communication device may transmit the request for the second resource pool configuration to the first receiving wireless communication device within the minimum resource block set. In some examples, the transmitting wireless communication device may transmit the request for the second resource pool configuration to a group of receiving wireless communication devices including the first receiving wireless communication device using the first resource pool configuration. For example, the communication and processing circuitry 1542, together with the transceiver 1510, shown and described above in connection with FIG. 15, may provide a means to communicate with the at least one receiving wireless communication device based on the first resource pool configuration.

Figure 17:
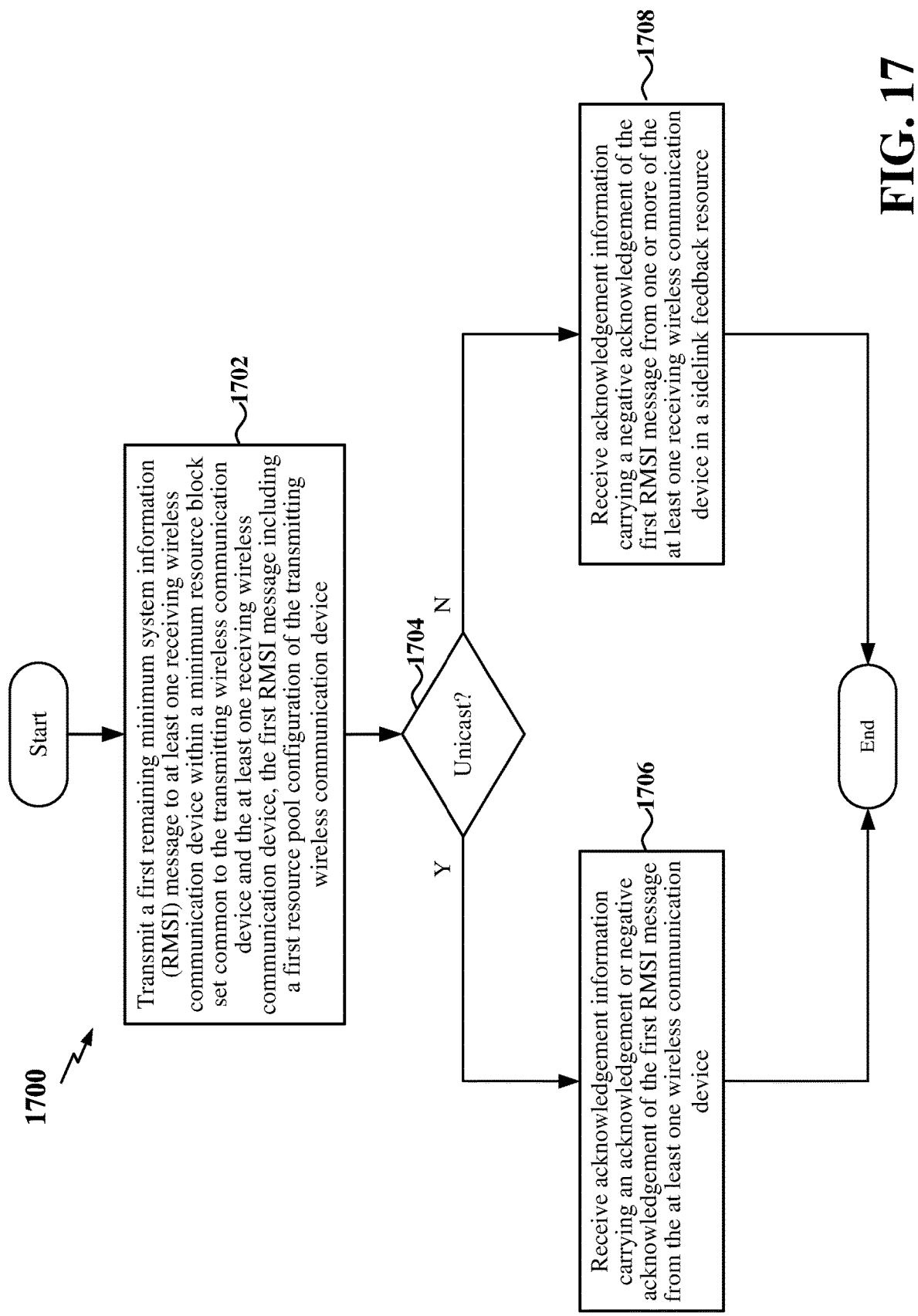
FIG. 17 is a flow chart of another exemplary process for RMSI transmission in sidelink according to some aspects.

FIG. 17 is a flow chart of another exemplary process 1700 for RMSI transmission in sidelink according to some aspects. As described below, some or all illustrated features may be omitted in a particular implementation within the scope of the present disclosure, and some illustrated features may not be required for implementation of all examples. In some examples, the method may be performed by the transmitting wireless communication device 1500, as described above and illustrated in FIG. 15, by a processor or processing system, or by any suitable means for carrying out the described functions.

At block 1702, the transmitting wireless communication device (e.g., a transmitting wireless communication device) may transmit a first remaining minimum system information (RMSI) message to at least one receiving wireless communication device within a minimum resource block set common to the transmitting wireless communication device and the at least one receiving wireless communication device. The first RMSI message includes a first resource pool configuration of the transmitting wireless communication device. In some examples, the first resource pool configuration includes at least one of a forward link resource pool configuration associated with sidelink transmissions from the transmitting wireless communication device or a reverse link resource pool configuration associated with sidelink transmissions received by the transmitting wireless communication device. In some examples, the forward link resource pool configuration is associated with a broadcast transmission or a groupcast transmission from the transmitting wireless communication device to the at least one receiving wireless communication device and the reverse link resource pool configuration is associated with reception of a unicast transmission from a first receiving wireless communication device of the at least one receiving wireless communication device.

In some examples, the first resource pool configuration includes a sidelink bandwidth part configuration and a sidelink resource block set configuration associated with the sidelink bandwidth part configuration. The sidelink resource block set configuration includes a set of one or more resource block sets, a respective starting resource block of each of a plurality of guard bands between respective ones of the one or more resource block sets, and a respective ending resource block of each of the plurality of guard bands.

In some examples, the first resource pool configuration is a first group resource pool configuration associated with a first group of receiving wireless communication devices. In this example, the transmitting wireless communication device may further include a group identifier of the first group of receiving wireless communication devices within the first RMSI message or within second stage sidelink control information associated with the first RMSI message. In some examples, the transmitting wireless communication device may further transmit a plurality of group resource pool configurations within the first RMSI. Each of the plurality of group resource pool configurations is associated with a respective one of a plurality of groups of receiving wireless communication devices. In addition, the transmitting wireless communication device may include a respective group identifier of each of the plurality of groups of receiving wireless communication devices within the first RMSI.

In some examples, the transmitting wireless communication device may further transmit second stage sidelink control information associated with the first RMSI message. The second stage sidelink control information including a source identifier identifying the transmitting wireless communication device and a destination identifier identifying the at least one receiving wireless communication device. In some examples, the transmitting wireless communication device may periodically transmit the first resource pool configuration to the at least one receiving wireless communication device. For example, the communication and processing circuitry 1542, together with the RMSI management circuitry 1544 and transceiver 1510, shown and described above in connection with FIG. 15, may provide a means to transmit the first RMSI message.

At block 1704, the transmitting wireless communication device may determine whether the first RMSI message is a unicast message. If the first RMSI message is a unicast message (Y branch of block 1704), at block 1706, the transmitting wireless communication device may receive acknowledgement information from the at least one receiving wireless communication device carrying an acknowledgement or a negative acknowledgement of the first RMSI message. If the first RMSI message is a broadcast message or a unicast message (N branch of block 1704), at block 1708, the transmitting wireless communication device may receive acknowledgement information carrying a negative acknowledgement of the first RMSI message from one or more of the at least one receiving wireless communication device in a sidelink feedback resource. For example, the communication and processing circuitry 1542, together with the transceiver 1510, shown and described above in connection with FIG. 15, may provide a means to receive acknowledgement information from the at least one receiving wireless communication device.

Figure 18:
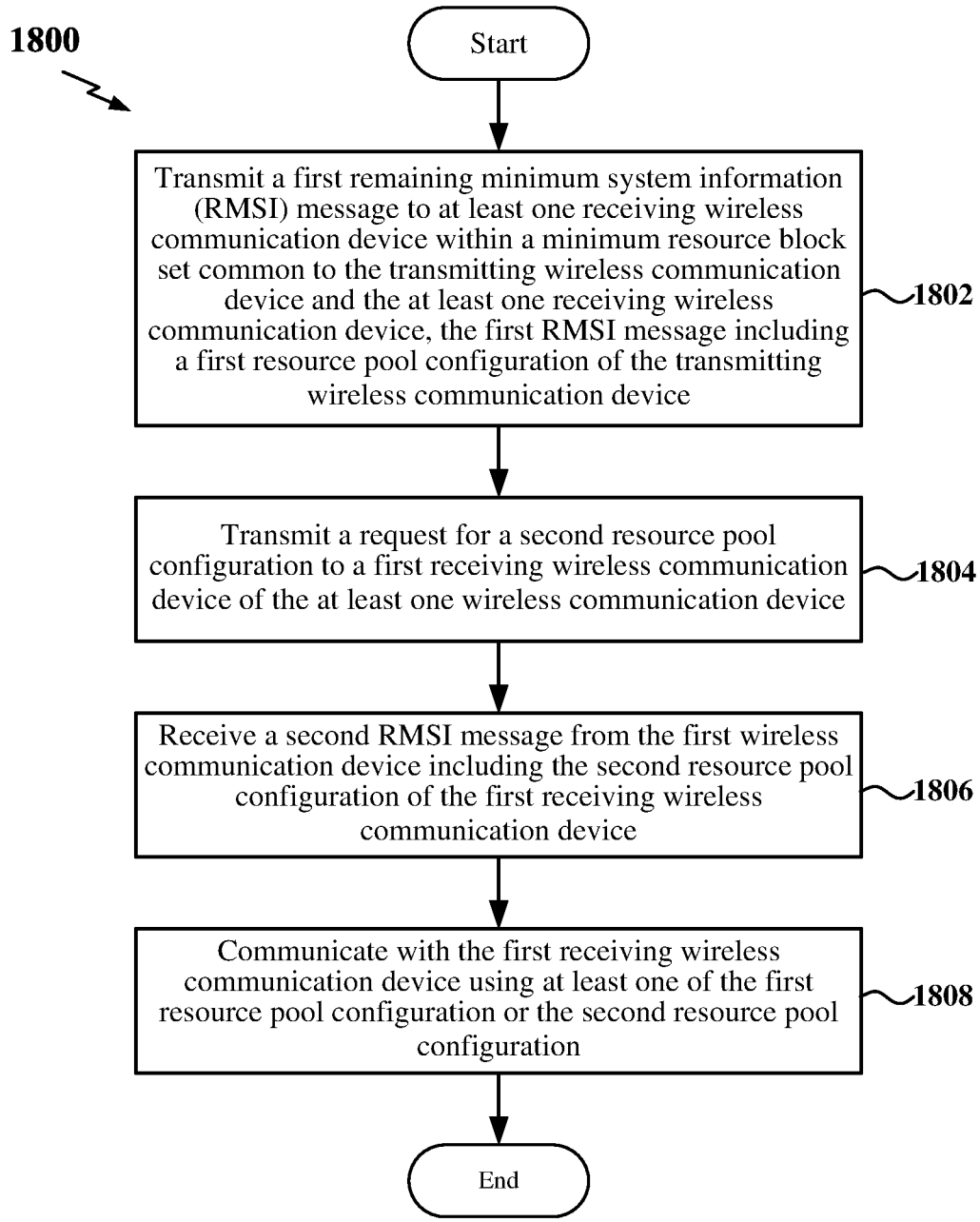
FIG. 18 is a flow chart of another exemplary process for RMSI transmission in sidelink according to some aspects.

FIG. 18 is a flow chart of another exemplary process 1800 for RMSI transmission in sidelink according to some aspects. As described below, some or all illustrated features may be omitted in a particular implementation within the scope of the present disclosure, and some illustrated features may not be required for implementation of all examples. In some examples, the method may be performed by the transmitting wireless communication device 1500, as described above and illustrated in FIG. 15, by a processor or processing system, or by any suitable means for carrying out the described functions.

At block 1802, the transmitting wireless communication device (e.g., a transmitting wireless communication device) may transmit a first remaining minimum system information (RMSI) message to at least one receiving wireless communication device within a minimum resource block set common to the transmitting wireless communication device and the at least one receiving wireless communication device. The first RMSI message includes a first resource pool configuration of the transmitting wireless communication device. In some examples, the first resource pool configuration includes at least one of a forward link resource pool configuration associated with sidelink transmissions from the transmitting wireless communication device or a reverse link resource pool configuration associated with sidelink transmissions received by the transmitting wireless communication device. In some examples, the forward link resource pool configuration is associated with a broadcast transmission or a groupcast transmission from the transmitting wireless communication device to the at least one receiving wireless communication device and the reverse link resource pool configuration is associated with reception of a unicast transmission from a first receiving wireless communication device of the at least one receiving wireless communication device.

In some examples, the first resource pool configuration includes a sidelink bandwidth part configuration and a sidelink resource block set configuration associated with the sidelink bandwidth part configuration. The sidelink resource block set configuration includes a set of one or more resource block sets, a respective starting resource block of each of a plurality of guard bands between respective ones of the one or more resource block sets, and a respective ending resource block of each of the plurality of guard bands.

In some examples, the first resource pool configuration is a first group resource pool configuration associated with a first group of receiving wireless communication devices. In this example, the transmitting wireless communication device may further include a group identifier of the first group of receiving wireless communication devices within the first RMSI message or within second stage sidelink control information associated with the first RMSI message. In some examples, the transmitting wireless communication device may further transmit a plurality of group resource pool configurations within the first RMSI. Each of the plurality of group resource pool configurations is associated with a respective one of a plurality of groups of receiving wireless communication devices. In addition, the transmitting wireless communication device may include a respective group identifier of each of the plurality of groups of receiving wireless communication devices within the first RMSI.

In some examples, the transmitting wireless communication device may further transmit second stage sidelink control information associated with the first RMSI message. The second stage sidelink control information including a source identifier identifying the transmitting wireless communication device and a destination identifier identifying the at least one receiving wireless communication device. In some examples, the transmitting wireless communication device may periodically transmit the first resource pool configuration to the at least one receiving wireless communication device. For example, the communication and processing circuitry 1542, together with the RMSI management circuitry 1544 and transceiver 1510, shown and described above in connection with FIG. 15, may provide a means to transmit the first RMSI message.

At block 1804, the transmitting wireless communication device may transmit a request for a second resource pool configuration to a first receiving wireless communication device of the at least one wireless communication device. In some examples, the transmitting wireless communication device may transmit the request for the second resource pool configuration within second stage sidelink control information of a sidelink message. The sidelink message may be a unicast message, groupcast message, or broadcast message. In some examples, the transmitting wireless communication device may transmit the request for the second resource pool configuration to the first receiving wireless communication device within the minimum resource block set. In some examples, the transmitting wireless communication device may transmit the request for the second resource pool configuration to a group of receiving wireless communication devices including the first receiving wireless communication device using the first resource pool configuration. For example, the communication and processing circuitry 1542, together with the RMSI management circuitry 1544 and transceiver 1510, shown and described above in connection with FIG. 15, may provide a means to transmit the request for the second resource pool configuration.

At block 1806, the transmitting wireless communication device may receive a second RMSI message from the first wireless communication device including the second resource pool configuration of the first receiving wireless communication device. In some examples, the second RMSI message is a unicast message, a broadcast message, or a groupcast message transmitted within the minimum resource block set. For example, the communication and processing circuitry 1542, together with the RMSI management circuitry 1544 and transceiver 1510, shown and described above in connection with FIG. 15, may provide a means to receive the second RMSI message.

At block 1808, the transmitting wireless communication device may communicate with the first receiving wireless communication device using at least one of the first resource pool configuration or the second resource pool configuration. In some examples, the transmitting wireless communication device may communicate with the first receiving wireless communication device using at least one of the first resource pool configuration or the second resource pool configuration based on a cast type of a sidelink transmission between the transmitting wireless communication device and the first receiving wireless communication device. For example, the communication and processing circuitry 1542, together with the transceiver 1510, shown and described above in connection with FIG. 15, may provide a means to communicate with the first receiving wireless communication device.

In one configuration, the wireless communication device 1500 includes means for transmitting a first remaining minimum system information (RMSI) message to at least one receiving wireless communication device within a minimum resource block set common to the transmitting wireless communication device and the at least one receiving wireless communication device, where the first RMSI message includes a first resource pool configuration of the transmitting wireless communication device. The wireless communication device 1500 further includes means for communicating with the at least one receiving wireless communication device on a sidelink based on the first resource pool configuration. In one aspect, the aforementioned means may be the processor 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIGS. 1 and/or 3, and utilizing, for example, the processes and/or algorithms described herein in relation to FIGS. 8-11, and 16-18.

The processes and/or algorithms shown in FIGS. 8-11, and 16-18 may include additional aspects, such as any single aspect or any combination of aspects described below and/or in connection with one or more other processes described elsewhere herein.

Aspect 1: A method for wireless communication at a transmitting wireless communication device, the method comprising: transmitting a first remaining minimum system information (RMSI) message to at least one receiving wireless communication device within a minimum resource block set common to the transmitting wireless communication device and the at least one receiving wireless communication device, the first RMSI message comprising a first resource pool configuration of the transmitting wireless communication device; and communicating with the at least one receiving wireless communication device on a sidelink based on the first resource pool configuration Aspect 2: The method of aspect 1, wherein the first resource pool configuration comprises at least one of a forward link resource pool configuration associated with sidelink transmissions from the transmitting wireless communication device or a reverse link resource pool configuration associated with sidelink transmissions received by the transmitting wireless communication device.

Aspect 3: The method of aspect 2, wherein the forward link resource pool configuration is associated with transmission of a broadcast transmission or a groupcast transmission to the at least one receiving wireless communication device and the reverse link resource pool configuration is associated with reception of a unicast transmission from a first receiving wireless communication device of the at least one receiving wireless communication device.

Aspect 4: The method of aspect 2 or 3, wherein the communicating with the at least one receiving wireless communication device further comprises: communicating with the at least one receiving wireless communication device using the first resource pool configuration.

Aspect 5: The method of any of aspects 1 through 4, wherein the first RMSI message is a unicast message, and further comprising: receiving acknowledgement information from the at least one receiving wireless communication device, the acknowledgement information carrying an acknowledgement or a negative acknowledgement of the first RMSI message.

Aspect 6: The method of any of aspects 1 through 4, wherein the first RMSI message is a broadcast message or a groupcast message, and further comprising: receiving acknowledgement information carrying a negative acknowledgement of the first RMSI message from one or more of the at least one receiving wireless communication device in a sidelink feedback resource.

Aspect 7: The method of any of aspects 1 through 6, further comprising: receiving a second RMSI message from a first receiving wireless communication device of the at least one receiving wireless communication device, the second RMSI message comprising a second resource pool configuration of the first receiving wireless communication device.

Aspect 8: The method of aspect 7, wherein the communicating with the at least one receiving wireless communication device further comprises: communicating with the first receiving wireless communication device using at least one of the first resource pool configuration or the second resource pool configuration.

Aspect 9: The method of aspect 8, wherein the communicating with the first receiving wireless communication device further comprises: communicating with the first receiving wireless communication device using at least one of the first resource pool configuration or the second resource pool configuration based on a cast type of a sidelink transmission between the transmitting wireless communication device and the first receiving wireless communication device.

Aspect 10: The method of any of aspects 7 through 9, further comprising: transmitting a request for the second resource pool configuration to the first receiving wireless communication device.

Aspect 11: The method of aspect 10, wherein the transmitting the request further comprises: transmitting the request for the second resource pool configuration within second stage sidelink control information of a sidelink message, wherein the sidelink message is a unicast message, groupcast message, or broadcast message.

Aspect 12: The method of aspect 10 or 11, wherein the transmitting the request further comprises: transmitting the request for the second resource pool configuration to the first receiving wireless communication device within the minimum resource block set.

Aspect 13: The method of aspect 10 or 11, wherein the transmitting the request further comprises: transmitting the request for the second resource pool configuration to a group of receiving wireless communication devices comprising the first receiving wireless communication device using the first resource pool configuration.

Aspect 14: The method of any of aspects 7 through 13, wherein the second RMSI message is a unicast message, a broadcast message, or a groupcast message transmitted within the minimum resource block set.

Aspect 15: The method of any of aspects 1 through 14, wherein the first resource pool configuration comprises a sidelink bandwidth part configuration and a sidelink resource block set configuration associated with the sidelink bandwidth part configuration, the sidelink resource block set configuration comprising a set of one or more resource block sets, a starting resource block of each of a plurality of guard bands between respective ones of the one or more resource block sets, and an ending resource block of each of the plurality of guard bands.

Aspect 16: The method of any of aspects 1 through 15, wherein the first resource pool configuration is a first group resource pool configuration associated with a first group of receiving wireless communication devices.

Aspect 17: The method of aspect 16, wherein the transmitting the first RMSI message further comprises: including a group identifier of the first group of receiving wireless communication devices within the first RMSI message or within second stage sidelink control information associated with the first RMSI message.

Aspect 18: The method of aspect 17, wherein the transmitting the first RMSI message further comprises: transmitting a plurality of group resource pool configurations within the first RMSI, each of the plurality of group resource pool configurations being associated with a respective one of a plurality of groups of receiving wireless communication devices; and including a respective group identifier of each of the plurality of groups of receiving wireless communication devices within the first RMSI.

Aspect 19: The method of any of aspects 1 through 16, wherein the transmitting the first RMSI message further comprises: transmitting second stage sidelink control information associated with the first RMSI message, the second stage sidelink control information comprising a source identifier identifying the transmitting wireless communication device and a destination identifier identifying the at least one receiving wireless communication device.

Aspect 20: The method of any of aspects 1 through 19, further comprising: periodically transmitting the first resource pool configuration to the at least one receiving wireless communication device.

Aspect 21: A transmitting wireless communication device comprising a transceiver, a memory, and a processor coupled to the transceiver and the memory, the processor and the memory configured to perform a method of any one of aspects 1 through 20.

Aspect 22: A transmitting wireless communication device comprising means for performing a method of any one of aspects 1 through 20.

Aspect 23: An article of manufacture comprising a non-transitory computer-readable medium having stored therein instructions executable by one or more processors of a transmitting wireless communication device to perform a method of any one of examples 1 through 20.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 8-11 and/or 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A transmitting wireless communication device configured for wireless communication, comprising:
one or more memories; and
one or more processors coupled to the one or more memories, the one or more processors configured to:
transmit a first remaining minimum system information (RMSI) message to at least one receiving wireless communication device within a minimum resource block set common to the transmitting wireless communication device and the at least one receiving wireless communication device, the first RMSI message comprising a first resource pool configuration of the transmitting wireless communication device;
receive a second RMSI message from a first receiving wireless communication device of the at least one receiving wireless communication device, the second RMSI message comprising a second resource pool configuration of the first receiving wireless communication device, the second resource pool configuration being different than the first resource pool configuration; and communicate with the at least one receiving wireless communication device on a sidelink based on at least one of the first resource pool configuration or the second resource pool configuration.

2. The transmitting wireless communication device of claim 1, wherein the first resource pool configuration comprises at least one of a forward link resource pool configuration associated with sidelink transmissions from the transmitting wireless communication device or a reverse link resource pool configuration associated with sidelink receptions received by the transmitting wireless communication device.

3. The transmitting wireless communication device of claim 2, wherein the forward link resource pool configuration is associated with a broadcast transmission or a groupcast transmission from the transmitting wireless communication device to the at least one receiving wireless communication device and the reverse link resource pool configuration is associated with reception of a unicast transmission from the first receiving wireless communication device of the at least one receiving wireless communication device.

4. The transmitting wireless communication device of claim 2, wherein the one or more processors are further configured to:
communicate with the at least one receiving wireless communication device using the first resource pool configuration.

5. The transmitting wireless communication device of claim 1, wherein the first RMSI message is a unicast message, and wherein the one or more processors are further configured to:
receive acknowledgement information from the at least one receiving wireless communication device, the acknowledgement information carrying an acknowledgement or a negative acknowledgement of the first RMSI message.

6. The transmitting wireless communication device of claim 1, wherein the first RMSI message is a broadcast message or a groupcast message, and wherein the one or more processors are further configured to:
receive acknowledgement information carrying a negative acknowledgement of the first RMSI message from one or more of the at least one receiving wireless communication device in a sidelink feedback resource.

7. The transmitting wireless communication device of claim 1, wherein the one or more processors are further configured to:
communicate with the first receiving wireless communication device using at least one of the first resource pool configuration or the second resource pool configuration.

8. The transmitting wireless communication device of claim 7, wherein the one or more processors are further configured to:
communicate with the first receiving wireless communication device using at least one of the first resource pool configuration or the second resource pool configuration based on a cast type of a sidelink transmission between the transmitting wireless communication device and the first receiving wireless communication device.

9. The transmitting wireless communication device of claim 1, wherein the one or more processors are further configured to:
transmit a request for the second resource pool configuration to the first receiving wireless communication device.

10. The transmitting wireless communication device of claim 9, wherein the one or more processors are further configured to:
transmit the request for the second resource pool configuration within second stage sidelink control information of a sidelink message, wherein the sidelink message is a unicast message, groupcast message, or broadcast message.

11. The transmitting wireless communication device of claim 9, wherein the one or more processors are further configured to:
transmit the request for the second resource pool configuration to the first receiving wireless communication device within the minimum resource block set.

12. The transmitting wireless communication device of claim 9, wherein the one or more processors are further configured to:
transmit the request for the second resource pool configuration to a group of receiving wireless communication devices comprising the first receiving wireless communication device using the first resource pool configuration.

13. The transmitting wireless communication device of claim 1, wherein the second RMSI message is a unicast message, a broadcast message, or a groupcast message transmitted within the minimum resource block set.

14. The transmitting wireless communication device of claim 1, wherein the first resource pool configuration comprises a sidelink bandwidth part configuration and a sidelink resource block set configuration associated with the sidelink bandwidth part configuration, the sidelink resource block set configuration comprising a set of one or more resource block sets, a starting resource block of each of a plurality of guard bands between respective ones of the one or more resource block sets, and an ending resource block of each of the plurality of guard bands.

15. The transmitting wireless communication device of claim 1, wherein the first resource pool configuration is a first group resource pool configuration associated with a first group of receiving wireless communication devices.

16. The transmitting wireless communication device of claim 15, wherein the one or more processors are further configured to:
include a group identifier of the first group of receiving wireless communication devices within the first RMSI message or within second stage sidelink control information associated with the first RMSI message.

17. The transmitting wireless communication device of claim 16, wherein the one or more processors are further configured to:
transmit a plurality of group resource pool configurations within the first RMSI, each of the plurality of group resource pool configurations being associated with a respective one of a plurality of groups of receiving wireless communication devices; and
include a respective group identifier of each of the plurality of groups of receiving wireless communication devices within the first RMSI.

18. The transmitting wireless communication device of claim 1, wherein the one or more processors are further configured to:

transmit second stage sidelink control information associated with the first RMSI message, the second stage sidelink control information comprising a source identifier identifying the transmitting wireless communication device and a destination identifier identifying the at least one receiving wireless communication device.

19. The transmitting wireless communication device of claim 1, wherein the one or more processors are further configured to:
periodically transmit the first resource pool configuration to the at least one receiving wireless communication device.

20. A method for wireless communication at a transmitting wireless communication device, the method comprising:
transmitting a first remaining minimum system information (RMSI) message to at least one receiving wireless communication device within a minimum resource block set common to the transmitting wireless communication device and the at least one receiving wireless communication device, the first RMSI message comprising a first resource pool configuration of the transmitting wireless communication device;
receiving a second RMSI message from a first receiving wireless communication device of the at least one receiving wireless communication device, the second RMSI message comprising a second resource pool configuration of the first receiving wireless communication device, the second resource pool configuration being different than the first resource pool configuration; and
communicating with the at least one receiving wireless communication device on a sidelink based on at least one of the first resource pool configuration or the second resource pool configuration.

21. The method of claim 20, wherein:
the first resource pool configuration comprises at least one of a forward link resource pool configuration associated with sidelink transmissions from the transmitting wireless communication device or a reverse link resource pool configuration associated with sidelink receptions received by the transmitting wireless communication device, and
the forward link resource pool configuration is associated with a broadcast transmission or a groupcast transmission from the transmitting wireless communication device to the at least one receiving wireless communication device and the reverse link resource pool configuration is associated with reception of a unicast transmission from the first receiving wireless communication device of the at least one receiving wireless communication device; and further comprising:
communicating with the at least one receiving wireless communication device using the first resource pool configuration.

22. The method of claim 20, further comprising:
receiving acknowledgement information from the at least one receiving wireless communication device, the acknowledgement information carrying an acknowledgement or a negative acknowledgement of the first RMSI message based on the RMSI message being a unicast message or a respective negative acknowledgement of the first RMSI message from one or more of the at least one receiving wireless communication device in a sidelink feedback resource based on the RMSI message being a broadcast message or a groupcast message.

23. The method of claim 20, wherein the communicating with the at least one receiving wireless communication device further comprises:
communicating with the first receiving wireless communication device using at least one of the first resource pool configuration or the second resource pool configuration based on a cast type of a sidelink transmission between the transmitting wireless communication device and the first receiving wireless communication device.

24. The method of claim 20, further comprising:
transmitting a request for the second resource pool configuration to the first receiving wireless communication device within the minimum resource block set or using the first resource pool configuration.

25. The method of claim 20, wherein the first resource pool configuration comprises a sidelink bandwidth part configuration and a sidelink resource block set configuration associated with the sidelink bandwidth part configuration, the sidelink resource block set configuration comprising a set of one or more resource block sets, a starting resource block of each of a plurality of guard bands between respective ones of the one or more resource block sets, and an ending resource block of each of the plurality of guard bands.

26. The method of claim 20, wherein the first resource pool configuration is a first group resource pool configuration associated with a first group of receiving wireless communication devices, and wherein the transmitting the first RMSI message further comprises:
including a group identifier of the first group of receiving wireless communication devices within the first RMSI message or within second stage sidelink control information associated with the first RMSI message.

27. The method of claim 20, further comprising:
periodically transmitting the first resource pool configuration to the at least one receiving wireless communication device.

28. A transmitting wireless communication device configured for wireless communication, comprising:
means for transmitting a first remaining minimum system information (RMSI) message to at least one receiving wireless communication device within a minimum resource block set common to the transmitting wireless communication device and the at least one receiving wireless communication device, the first RMSI message comprising a first resource pool configuration of the transmitting wireless communication device;
means for receiving a second RMSI message from a first receiving wireless communication device of the at least one receiving wireless communication device, the second RMSI message comprising a second resource pool configuration of the first receiving wireless communication device, the second resource pool configuration being different than the first resource pool configuration; and
means for communicating with the at least one receiving wireless communication device on a sidelink based on at least one of the first resource pool configuration or the second resource pool configuration.

* * * * *